United States Patent
Phan et al.

(10) Patent No.: US 11,954,615 B2
(45) Date of Patent: Apr. 9, 2024

(54) MODEL MANAGEMENT FOR NON-STATIONARY SYSTEMS

(71) Applicant: International Business Machines, Armonk, NY (US)

(72) Inventors: Dung Tien Phan, Ossining, NY (US); Robert Jeffrey Baseman, Brewster, NY (US); Fateh Ali Tipu, Wappingers Falls, NY (US); Nam H. Nguyen, Pleasantville, NY (US); Ramachandran Muralidhar, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 965 days.

(21) Appl. No.: 16/654,604

(22) Filed: Oct. 16, 2019

(65) Prior Publication Data

US 2021/0117836 A1   Apr. 22, 2021

(51) Int. Cl.
*G06N 7/01* (2023.01)
*G06F 17/18* (2006.01)
(Continued)

(52) U.S. Cl.
CPC .............. *G06N 7/01* (2023.01); *G06F 17/18* (2013.01); *G06F 30/20* (2020.01); *G06N 20/00* (2019.01);
(Continued)

(58) Field of Classification Search
CPC ........ G06N 7/005; G06N 20/00; G06F 17/18; G06F 30/20; G06F 2111/10; G06F 2119/18
See application file for complete search history.

(56) References Cited

U.S. PATENT DOCUMENTS 7,080,290 B2   7/2006 James et al.
9,087,176 B1   7/2015 Chang
(Continued)

FOREIGN PATENT DOCUMENTS

CN   102361014   2/2012
CN   106681183   5/2017
(Continued)

OTHER PUBLICATIONS

Ma, J., Jiang, J., Liu, C., & Li, Y. (2017). Feature guided Gaussian mixture model with semi-supervised EM and local geometric constraint for retinal image registration. Information Sciences, 417, 128-142. (Year: 2017).*

(Continued)

*Primary Examiner* — Bijan Mapar
(74) *Attorney, Agent, or Firm* — Peter Edwards; Otterstedt & Kammer PLLC

(57) ABSTRACT

A method of improving at least one of quality and yield of a physical process comprises: obtaining values, from respective performances of the physical process, for a plurality of variables associated with the physical process; determining at least one Gaussian mixture model (GMM) representing the values for the variables for the performances of the physical process; based at least in part on the at least one GMM, computing at least one anomaly score for at least one of the variables for at least one of the performances of the physical process; based on the at least one anomaly score, identifying the at least one of the performances of the physical process as an outlier; and, based at least in part on the outlier identification, modifying the at least one of the variables for one or more subsequent performances of the physical process.

20 Claims, 29 Drawing Sheets

(51) Int. Cl.
   *G06F 30/20* (2020.01)
   *G06F 111/10* (2020.01)
   *G06F 119/18* (2020.01)
   *G06N 20/00* (2019.01)

(52) U.S. Cl.
   CPC ....... *G06F 2111/10* (2020.01); *G06F 2119/18* (2020.01)

(56) References Cited

U.S. PATENT DOCUMENTS

| | | | |
|---|---|---|---|
| 9,625,354 | B2 | 4/2017 | Ide et al. |
| 2015/0012250 | A1 | 1/2015 | Li |
| 2015/0127595 | A1 | 5/2015 | Hawkins, II et al. |
| 2018/0330493 | A1 | 11/2018 | Milligan |
| 2019/0096659 | A1 | 3/2019 | Xu et al. |
| 2019/0130659 | A1 | 5/2019 | Ide |

FOREIGN PATENT DOCUMENTS

| | | | | |
|---|---|---|---|---|
| CN | 109116834 | | 1/2019 | |
| CN | 109116834 A | * | 1/2019 | ........... G05B 23/024 |
| CN | 109116834 A | | 1/2019 | |
| JP | 2017514294 A | | 6/2017 | |
| WO | 2015134709 A1 | | 9/2015 | |

OTHER PUBLICATIONS

Wang, C., Wang, T., Wang, E., Sun, E., & Luo, Z. (2019). Flying small target detection for anti-UAV based on a Gaussian mixture model in a compressive sensing domain. Sensors, 19(9), 2168. (Year: 2019).*

Ma Lili, International Search Report, PRC as ISA, Counterpart PCT Application PCT/IB2020/059626, dated Jan. 27, 2021. pp. 10.

J N Pyecroft, Chartered Patent Attorney. UK Intellectual Property Office In response to the Examination Report in counterpart British application GB2204915.9 dated Jun. 19, 2023. pp. 4.

United Kingdom Intellectual Property Office Examination Report in counterpart British application GB2204915.9 dated Apr. 25, 2023. pp. 6.

Sakaniwa, Takeshi. Office Action on related Japanese Patent Application No. 2022-521145, dated Dec. 26, 2023. Pages: 5 (English Translation).

* cited by examiner

*FIG. 3*

| 310 | 320 | 330 | 340 | 350 | 360 |
|---|---|---|---|---|---|
| ChamberID | TimeStamp | RecipeStep | Voltage | Pressure | Temperature |
| CH2 | 3/13/2017 7:11:03 | 0 | 620 | 0.0006 | 53.70 |
| CH2 | 3/13/2017 7:11:04 | 0 | 618 | 0.0006 | 53.90 |
| CH2 | 3/13/2017 7:11:05 | 0 | 618 | 0.0006 | 53.80 |
| CH2 | 3/13/2017 7:11:06 | 0 | 617 | 0.0009 | 53.40 |
| CH2 | 3/13/2017 7:11:07 | 0 | 616 | 0.0010 | 54.10 |
| CH2 | 3/13/2017 7:11:08 | 0 | 645 | 0.2360 | 55.00 |
| CH2 | 3/13/2017 7:11:09 | 0 | 642 | 0.6051 | 54.60 |
| CH2 | 3/13/2017 7:11:10 | 1 | 637 | 0.5158 | 54.70 |
| CH2 | 3/13/2017 7:11:11 | 1 | 636 | 0.4533 | 54.80 |
| CH2 | 3/13/2017 7:11:12 | 1 | 631 | 4.1793 | 54.50 |
| CH2 | 3/13/2017 7:11:13 | 1 | 635 | 7.4175 | 53.70 |

FIG. 11

Algorithm 1 Multi-modal Graphical Model

1100 procedure MGM($\mathcal{D}, K, \lambda, \beta, \epsilon$)
1101     Initialize $\{(\mu_k, \Sigma_k)\}$ by the $k$-Mean algorithm
1102     Set $\pi_k = \frac{1}{K}$ for all $k$
1103     repeat
1104         $r_k^n \leftarrow \frac{\pi_k \mathcal{N}(x_n | \mu_k, \Sigma_k)}{\sum_{j=1}^K \pi_j \mathcal{N}(x_n | \mu_j, \Sigma_j)}$ for $n = 1, \ldots, N, k = 1, \ldots, K$
1105         for $k \leftarrow 1, K$ do
1106             $N_k \leftarrow \sum_{n=1}^N r_k^n$
1107             $\mu_k \leftarrow \frac{1}{N_k} \sum_{n=1}^N r_k^n x_n$
1108             $\hat{S}_k \leftarrow \frac{1}{N_k} \sum_{n=1}^N r_k^n (x_n - \mu_k)(x_n - \mu_k)^T$
1109         end for

1110         $\pi \leftarrow \begin{cases} \min_{\pi, y} \quad f(\pi, y) \equiv -\sum_{k=1}^K N_k \ln(\pi_k) + \lambda \sum_{k=1}^K y_k \\ \text{s.t.} \quad \sum_{k=1}^K \pi_k = 1, \pi_k \geq 0, \\ \quad\quad y_k \geq \pi_k - \epsilon, y_k \in \{0, 1\}, k = 1, \ldots, K. \end{cases}$ 1111         $\Sigma_k \leftarrow \text{ICU}(\hat{S}, \pi, r, \beta)$
1112     until convergence
1113     return $\{\pi_k\}$ and $\{\mu_k, \Sigma_k\}$
1114 end procedure

Algorithm 2 Inverse Covariance Update

1200 procedure ICU($\hat{S}, \pi, r, \beta$)
1201     Initialize $\Sigma_k = (\text{diag}(\hat{S}_k) + 10^{-2}I_N)^{-1}$, $\Gamma_k = \Sigma_k$, $Y_k = 0$ and select $\delta > 0$.
1202     $(\sigma, K') \leftarrow \text{TOC}(\pi, r)$
1203     repeat
1204        Take the eigenvalue decomposition $\frac{\beta}{N_k}(\Gamma_k - Y_k) - \hat{S}_k = QUQ^T$
           where $U = \text{diag}(u_1, \ldots, u_N)$.
1205        $\Sigma_k \leftarrow Q\hat{U}Q^T$ where $\hat{u}_i = \frac{N_k u_i + N_k\sqrt{u_i^2 + 4\delta/N_k}}{2\delta}$ and $\hat{U} = \text{diag}(\hat{u}_1, \ldots, \hat{u}_N)$
1206        Update $\Gamma$ as the solution of $$\min_{\Gamma} \sum_{k=1}^{K'} \left( \text{tr}(\hat{S}_{\sigma(k)} \Gamma_{\sigma(k)}) - \log \det(\Gamma_{\sigma(k)}) \right) + \beta \sum_{k=1}^{K-1} \|\Gamma_{\sigma(k)} - \Gamma_{\sigma(k+1)}\|_0$$

$$\|\Gamma_{\sigma(k)}\|_0 \leq \kappa_{\sigma(k)}, \forall k = 1, \ldots, K'$$

1207        $Y_k \leftarrow Y_k + \Sigma_k - \Gamma_k$
1208     until convergence
1209 return $\{\Sigma\}$
1210 end procedure

*FIG. 13*

---
Algorithm 3 Temporal Ordering Clustering
1300 procedure TOC($\pi$, $r$)
1301  Step 1. Define $\mathcal{I} = \{k : \pi_k > \epsilon\}$ and $K' = |\mathcal{I}|$.
1302  Step 2. Assign each data point $x_n$ to a cluster in $\mathcal{I}$ such that the corresponding $r_k^n$ is maximized for $k \in \mathcal{I}$.
1303  Step 3. Compute the mean $m_k \in \mathbb{R}(k \in \mathcal{I})$ of the temporal feature for all data points in each cluster $k \in \mathcal{I}$.
1304  Step 4. Sort $m_k$ in a increasing order, and define $\sigma$ by the mapping from $\mathcal{I}$ to the sorted index set.
1305 return $\{\sigma, K'\}$
1306 end procedure

---
Algorithm 4 Sparse Weight Selection Algorithm    SWSA($a, \tau, \epsilon$)
---

1401  Set $f_{min} \leftarrow -\sum_{k=1}^{K} a_k \ln(a_k) + n\tau$
1402  for $m = 0, 1, \ldots, n-1$ do
1403   if $m = 0$ or $a_m \leq \epsilon$ then
1404    $\pi \leftarrow a$
1405   else
1406    Find $t \leq m$ such that $a_t < \epsilon \leq a_{t+1}$
1407    if $t = 0$ then
1408     $\pi_k \leftarrow \begin{cases} \epsilon, & \text{if } k \leq m \\ \frac{a_k(1 - m\epsilon)}{\sum_{i=m+1}^{} a_i}, & \text{otherwise} \end{cases}$
1409    else
1410     for $\hat{k} = t, t-1, \ldots, 1$ do
1411      $\pi_k \leftarrow \begin{cases} \epsilon, & \text{if } \hat{k} < k \leq m \\ \pi_k = \frac{a_k(1-(m-\hat{k})\epsilon)}{\sum_{i \leq \hat{k} \text{ or } i > m} a_i}, & \text{otherwise} \end{cases}$
1412      if $\left( \pi_{\hat{k}} < \epsilon \text{ and } a_{\hat{k}+1}(1 - (m - \hat{k})\epsilon) \geq \epsilon \sum_{i \leq \hat{k} \text{ or } i > m} a_i \right)$ then
1413       break
1414      end if
1415     end for
1416    end if
1417    $g(\pi) \leftarrow -\sum_{k=1}^{K} a_k \ln(\pi_k) + \tau |\{i : \pi_i > \epsilon\}|$
1418    if $g(\pi) < f_{min}$ then
1419     $f_{min} \leftarrow g(\pi)$ and $\pi^* \leftarrow \pi$
1420    end if
1421   end if
1422  end for
1423  return $\pi^*$

MODEL MANAGEMENT FOR NON-STATIONARY SYSTEMS

BACKGROUND

The present invention relates to the electrical, electronic, and computer arts, and more specifically, to manufacturing microelectronic products and/or semiconductor devices, such as integrated circuit (IC) fabrication.

Manufacturing microelectronic products and/or semiconductor devices, such as IC fabrication, typically involves multiple stages comprising hundreds of unit processes. The overall quality and yield of microelectronic products depends on the quality of yield of individual unit processes, as well as on the successful integration of hundreds of unit processes. Moreover, semiconductor manufacturing can involve non-stationary systems. However, anomaly detection for non-stationary systems by simple statistical approaches is difficult. Thus, there as a long-felt but unmet need for improving the quality and yield of individual unit processes or small aggregations thereof.

SUMMARY

An aspect of the invention is directed to a method of improving at least one of quality and yield of a physical process. The method includes: obtaining values, from respective performances of the physical process, for a plurality of variables associated with the physical process; determining at least one Gaussian mixture model (GMM) representing the values for the plurality of variables for the performances of the physical process; based at least in part on the at least one GMM, computing at least one anomaly score for at least one of the variables for at least one of the performances of the physical process; based on the at least one anomaly score for the at least one of the variables, identifying the at least one of the performances of the physical process as an outlier; and, based at least in part on the outlier identification, modifying the at least one of the variables for one or more subsequent performances of the physical process so as to improve the at least one of quality and yield of the physical process.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) (e.g., a computer) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

These and other features and advantages of the present invention will become apparent from the following detailed description of illustrative embodiments thereof, which is to be read in connection with the accompanying drawings.

BRIEF DESCRIPTION OF THE DRAWINGS

FIG. 3 is a chart showing time series measurements;

FIG. 11 shows a multi-model graphical model (MGM) algorithm in accordance with an aspect of the present invention;

FIG. 12 shows an inverse covariance update (ICU) algorithm in accordance with an aspect of the present invention;

FIG. 13 shows a temporal ordering clustering (TOC) algorithm in accordance with an aspect of the present invention;

FIG. 14 shows a sparse weight selection algorithm (SWSA) in accordance with an aspect of the present invention;

DETAILED DESCRIPTION

Although embodiments of the present invention are primarily described with reference to manufacturing microelectronic products and/or semiconductor devices, such as integrated circuit (IC) fabrication, one skilled in the art will understand that aspects of the present invention may be used in many other applications. For example, in addition to semiconductor manufacturing, principles of the present invention may be generally applicable to, e.g., internet-of-things (IOT) technology and solutions, big data, and/or analytics.

Figure 1:
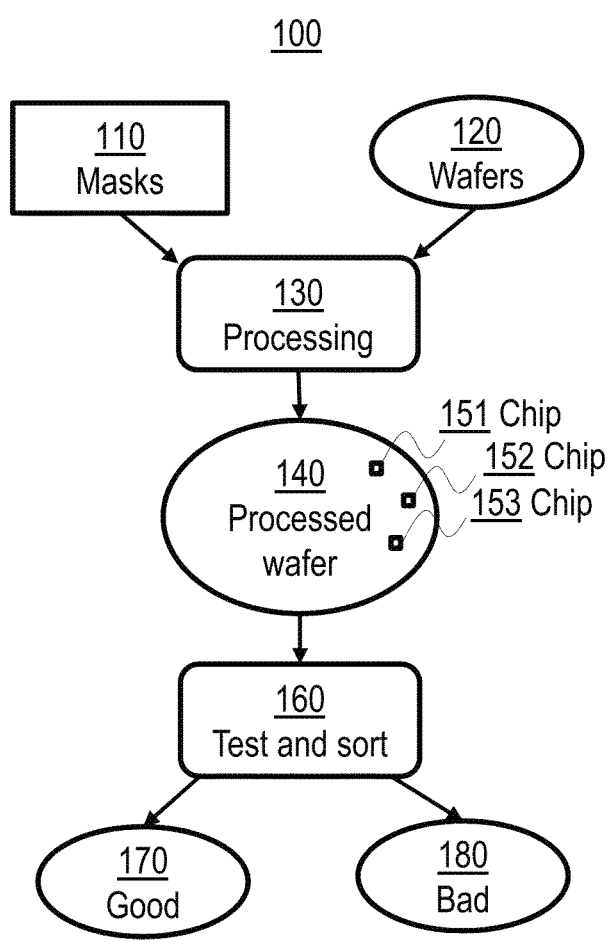
FIG. 1 is a flowchart showing aspects of IC fabrication.

FIG. 1 is a flowchart showing aspects of IC fabrication process 100. Masks 110 may be fabricated based on the finalized physical layout of an IC. In some embodiments, the IC layout may be instantiated as a design structure comprising physical design data, and the design structure can be provided to fabrication equipment to facilitate fabrication of a physical integrated circuit in accordance with the design structure. Wafers 120 are then processed in step 130, e.g., by using the masks 140 to perform photolithography and etching of a wafer 120. Generally, during processing 130, a wafer 130 with multiple copies 151, 152, 153 of the final design is fabricated and cut (i.e., diced) such that each die 151, 152, 153 is one copy of the integrated circuit. Once the wafer is diced, testing and sorting each die is performed at 160 to filter out any faulty die. Thus, each IC (die) is sorted as being either good 170 (passing all tests) or bad 180 (failing one or more tests).

As previously noted, manufacturing microelectronic products and/or semiconductor devices, such as IC fabrication, typically involves multiple stages comprising hundreds of unit processes. The overall quality and yield of microelectronic products depends on the quality of yield of individual unit processes, as well as on the successful integration of hundreds of unit processes. Process (e.g., unit process) quality may be inferred by tool sensor time series measurements (reflecting tool condition and recipes), incoming (partially finished) product characteristics, and other in-process measurements. Thus, illustrative embodiments provide a method for improving product quality and/or yield (e.g., of a metallization process) that employs a predictive model of semiconductor manufacturing using toolset-related data, wafer data, and ancillary data for detection and remediation of anomalies in processes.

Figure 2:
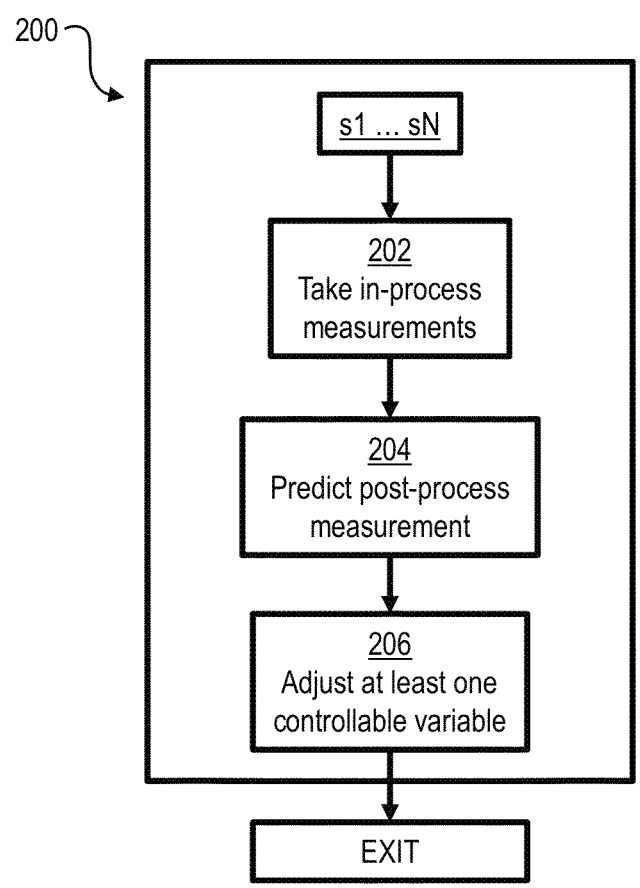
FIG. 2 is a flowchart showing a control process according to an exemplary embodiment.

FIG. 2 is a flowchart showing a control process 200 according to an exemplary embodiment. During each of the process steps s1 . . . sN, in-process measurements are taken at 202 (e.g., to observe the current state of an asset) and the post-process measurement is predicted at 204 based on those in-process measurements (e.g., learning a predictive model). A non-limiting example of a post-process measurement is wafer resistivity. Non-limiting examples of in-process measurements are plasma voltages, currents, temperatures, and pressures as well as elapsed time during material deposition or etch. At 206, at least one controllable variable of the present process step is adjusted (e.g., taking control actions to change characteristics of an asset) in response to the prediction of the post-process measurement, so as to reduce an error differential between the prediction and a target value of the post-process measurement.

FIG. 3 is a chart showing time series measurements for an exemplary IC fabrication process. More particularly, FIG. 3 shows various variables in columns 310-360, with the rows corresponding to respective executions (runs) of the process (recipe). Column 310 shows the chamber ID. These variables are the same for all of the rows shown in FIG. 3. Although not shown in FIG. 3, embodiments may also include a wafer ID and/or a tool ID. Column 320 shows the time stamp, and column 330 shows the recipe step. Column 340 shows a voltage, column 350 shows a time, and column 360 shows a pressure. Each row in FIG. 3 contains a unique value for each of these values, although one skilled in the art would understand that duplicate values are possible.

Figure 4A:
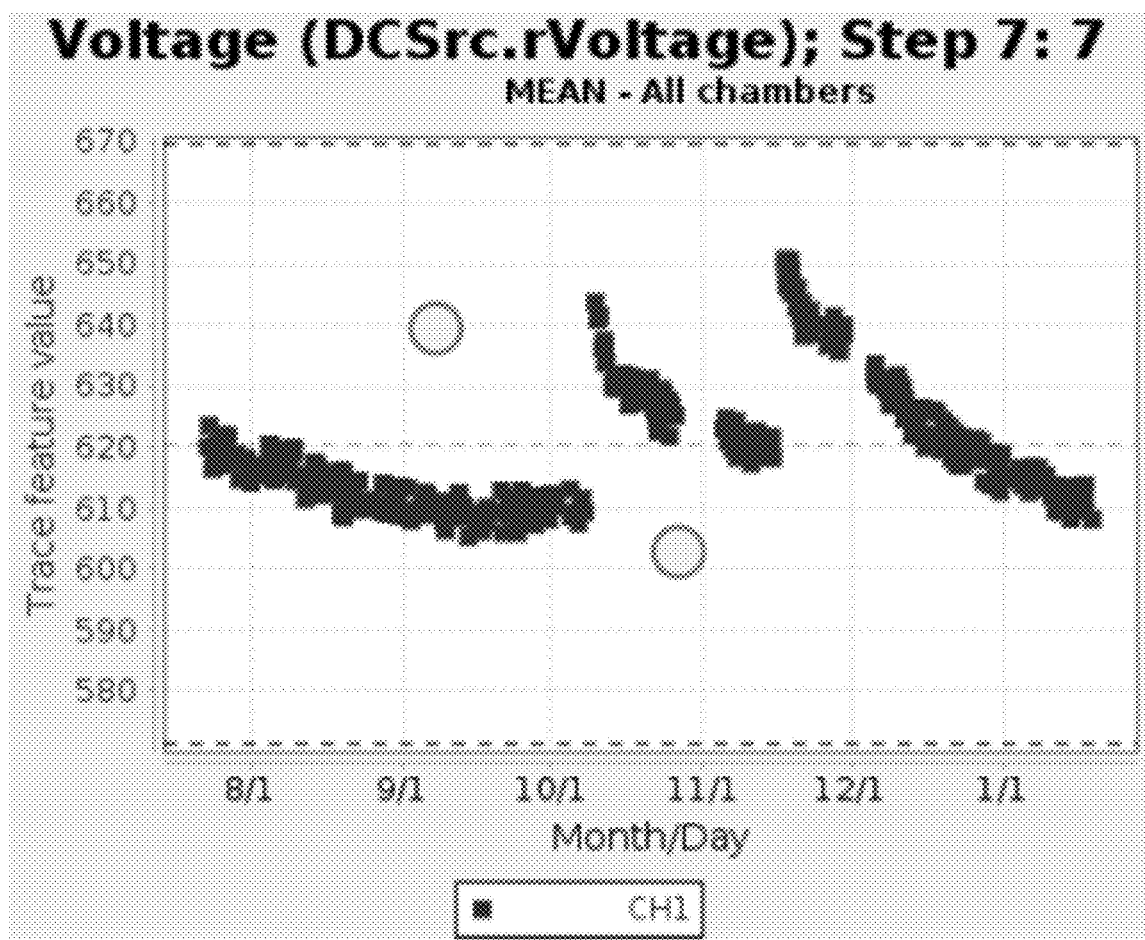
FIG. 4A is a graph showing a periodic related normal variable with outliers.

FIG. 4A is a graph showing a periodic related normal variable. Specifically, FIG. 4A is a chart showing a mean direct current source voltage DCSrc.rVoltage, for Chamber 1 (CH1) in Step 7 for executions of the process on different dates. Thus, each of the squares shown in FIG. 4A represents a voltage value (y-axis) for an execution of the process on a given date (x-axis), with many dates having multiple executions and hence multiple values for that date. FIG. 4A shows that this voltage value is a periodic related normal variable: there is a repeated pattern of the variable abruptly increasing (e.g., to above 640 at least starting around October 10), then gradually decreasing (e.g., to below 620 at least until around November 15), before abruptly increasing again (e.g., to above 650 at least starting around November 15), followed by another gradual decrease (e.g., to below 610 at least until around January 15), and so on. FIG. 4A also includes values, shown as circles rather than squares, which are outliers relative to the aforementioned periodic related normal pattern.

Figure 4B:
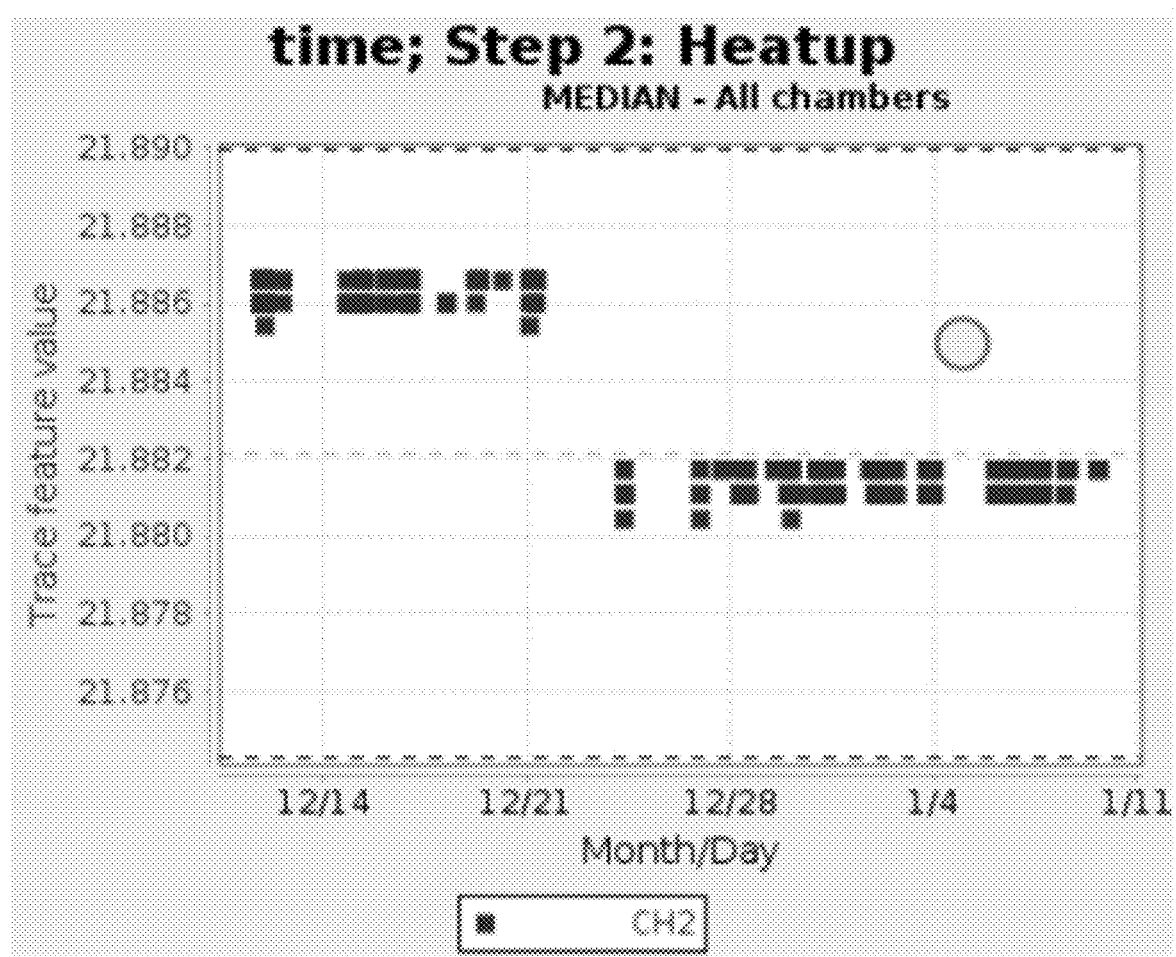
FIG. 4B is a graph showing a multimodal normal variable with outliers.

FIG. 4B is a graph showing a multimodal normal variable. Specifically, FIG. 4B is a a median heat-up time for Chamber 2 (CH2) in Step 2 for executions of the process on different dates. Thus, each of the squares shown on FIG. 4B represents a heat-up time value (y-axis) for an execution of the process on a given date (x-axis), with many dates having multiple executions and hence multiple values for that date. FIG. 4B shows that this heat-up time value is a multimodal normal variable: the variable clusters within a first range during a first period (between 21.885 and 21.887 until December 21 starting at least from December 10), then clusters within a second range during a second period (between 21.880 and 21.882 starting from December 22 at least until January 11). FIG. 4B also includes values, shown as circles rather than squares, which are outliers relative to the aforementioned multimodal normal pattern.

Figure 4C:
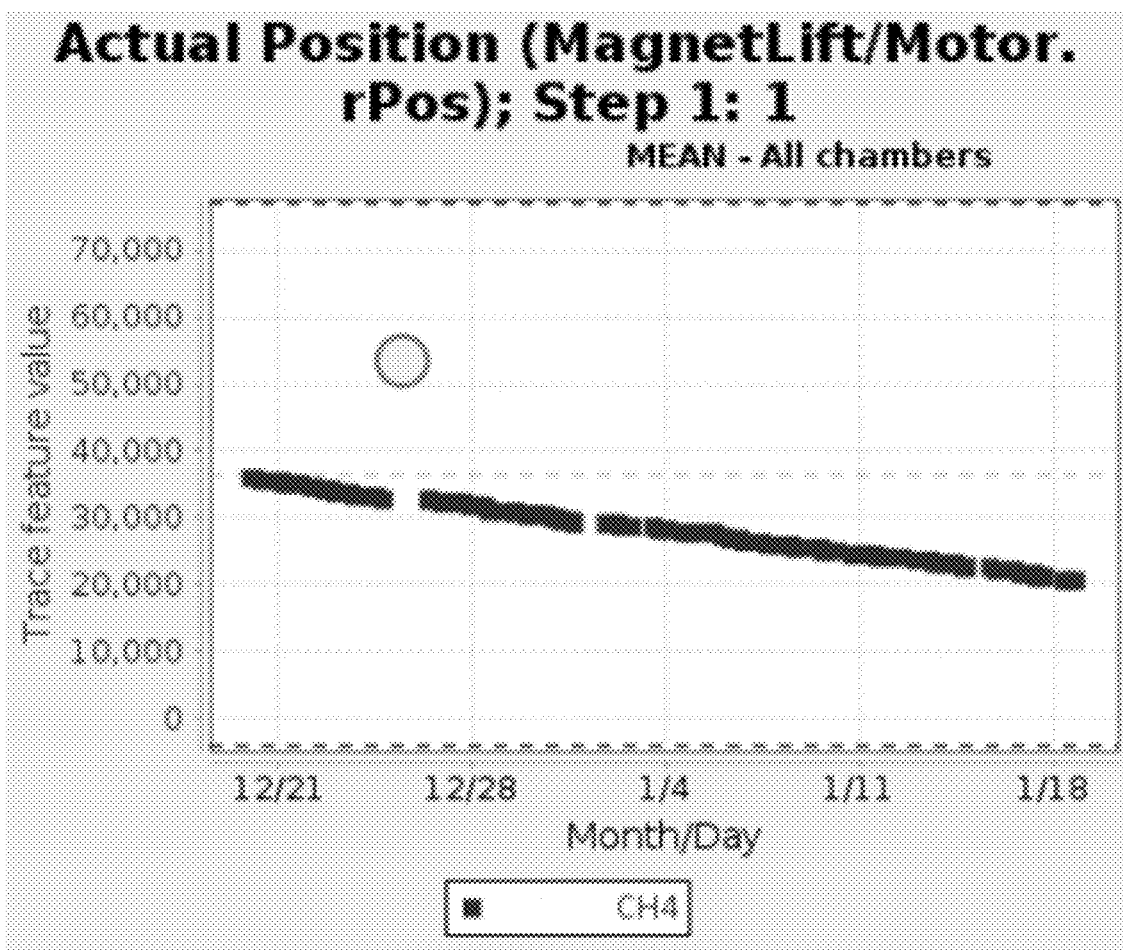
FIG. 4C is a graph showing a drifting normal variable with outlier.

FIG. 4C is a graph showing a drifting normal variable. Specifically, FIG. 4C is a chart showing a mean actual position of a magnet lift motor (MagNetLift/Motor.rPos) for Chamber 4 (CH4) in Step 1 of theAmber Lamp First Warmup recipe) for executions of the process on different dates. Thus, each of the squares shown on FIG. 4C represents a mean actual position (y-axis) for an execution of the process on a given date (x-axis), with many dates having multiple executions and hence multiple values for that date. FIG. 4C shows that this mean actual position value is a drifting normal variable: the variable gradually decreases at a steady rate (e.g., constant slope), e.g., from approximately 37 on or before December 21, to approximately 20 on or after January 18. FIG. 4C also includes values, shown as circles rather than squares, which are outliers relative to the aforementioned drifting normal pattern.

Figure 5:
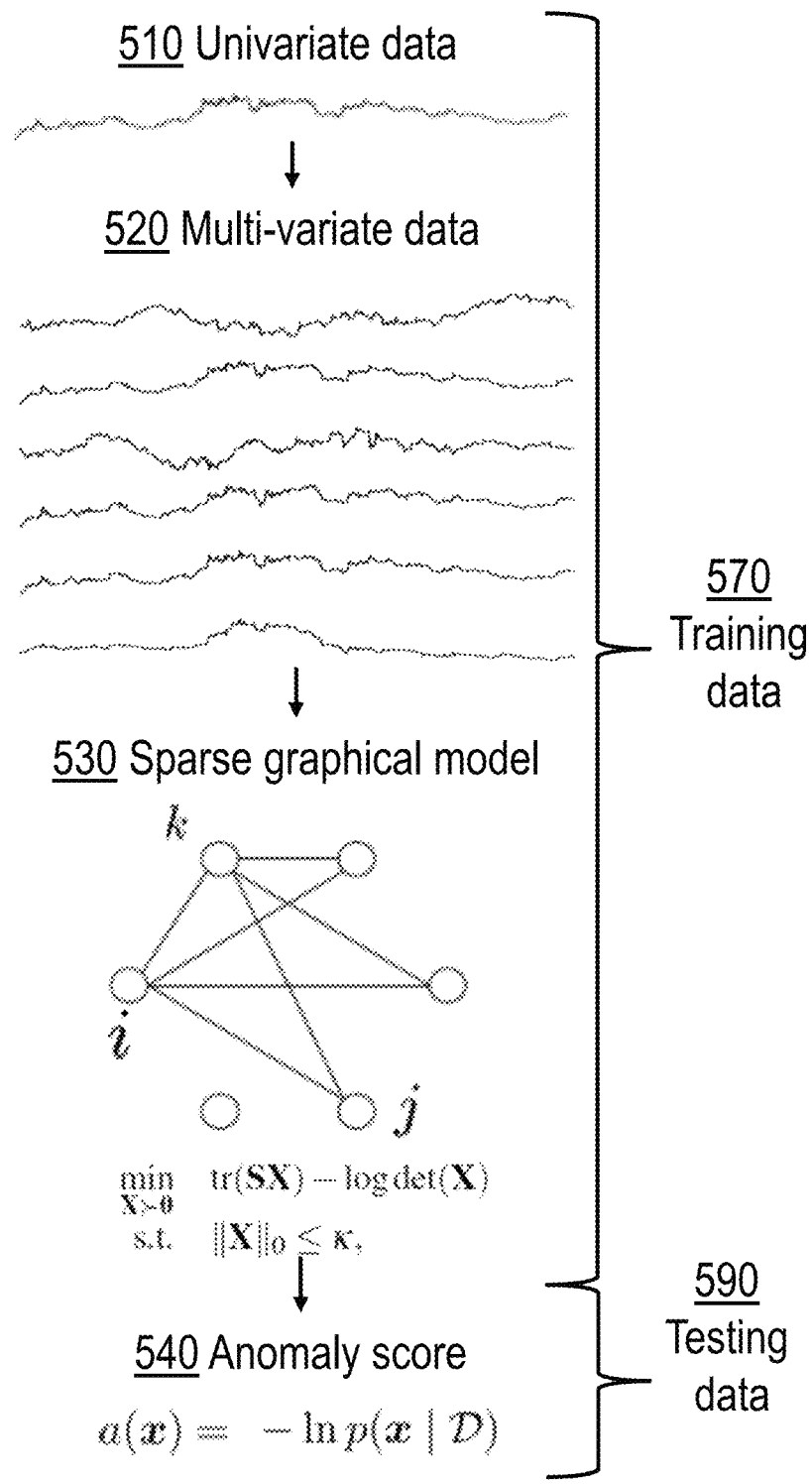
FIG. 5 shows an anomaly detection approach in accordance with an aspect of the present invention.

FIG. 5 shows an anomaly detection approach in accordance with an aspect of the present invention. The anomaly detection approach may begin with either univariate data 510 or multivariate (e.g., multidimensional) data 520. If univariate data 510 is provided, it is converted to multivariate (e.g., three-dimensional) data 520 using temporal information. Each data point $X^t$ may be considered in a three-dimensional space, comprising the observation value $x^t$, the timestamp t, and a function of the gaps between the observation value and one or more other values (e.g., one or more values preceding and/or following the observation value), as further discussed below with reference to FIG. 8.

The minimum gap between the preceding and following values:

$$\min(|x^t-x^{t-1}|,|x^t-x^{t+1}|)$$

Whether provided directly or indirectly through conversion of univariate data 510, multivariate data 520 is used to determine a sparse graphical model 530, which may be, for example, a Gaussian graphical model (GGM) and/or a Gaussian mixture model (GMM) as further discussed below with reference to FIG. 6. In some embodiments, the one or more sparse graphical models 530 may comprise one or more doubly-sparse multi-task, multi-modal Gaussian graphical models (MTL-MM GGMs), learned from data based on a Bayesian formulation. The double-sparsity may include sparsity in the dependency structure of the GGM and sparsity over the mixture components.

Within a given GGM graph, such as that denoted by 530 in FIG. 4, the nodes represent variables, and the lines represent non-zero (positive or negative) dependencies between variables. Some embodiments may use a solid line to denote a positive dependency and a dashed line to denote a negative dependency. Some embodiments may depict the strength of dependencies by the thickness of the connecting lines, with a thicker line denoting a stronger dependency. The dependency information are correlation coefficients captured by the GGM model, and provides a summary capturing the normal state of the particular system. The normal state of operations is a mixture of different dynamic conditions which is captured by the GGM graphs. This dependency information is useful to understand variable insights.

The aforementioned univariate data 510, multivariate data 520, and sparse graphical model 430 may comprise training data 570. By contrast, testing data 590 may include an anomaly score 540. For a new sample x, the anomaly score 540, denoted as $a(x)=-\ln p(x|\mathcal{D})$, where ln denotes a natural logarithm, and $p(x|\mathcal{D})$ is a predictive distribution which is learned based on the training data 570, denoted as $\mathcal{D}$.

In some embodiments, anomaly scores 540 may be generated at predefined times, e.g., periodically, such as once every 15 minutes. In some embodiments, an anomaly score 540 may be produced for the entire system and for each of (or at least for one or more of) the sensors within the system. For example, current (on-line) samples of recent multivariate sensor data 520 could be received and, using the received data of a present time window, an overall anomaly score 540 for the system may be generated. Moreover, the most recent multivariable data 520 corresponding to recent time-series from each of (or at least one or more of) the sensors of the system may be processed, and individual "per-variable" anomaly scores 540 may be generated to indicate the dynamic behavior or "health" of that system. As will be described, the generating of the anomaly score(s) 540 may involve the automated solving (updating) of the model(s) 530 associated with the system.

As previously noted, sparse graphical model 530 may comprise a Gaussian graphical model (GGM) and, more specifically, a Gaussian mixture model (GMM). A GMM is a probability distribution p(x) formed as a weighted sum of K single component Gaussian densities and/or distributions x:

$$p(x) = \sum_{k=1}^{K} \pi_k \mathcal{N}(x|\mu_k, \Sigma_k)$$

$$\forall k: \pi_k \geq 0 \sum_{k=1}^{K} \pi_k = 1$$

where $\pi_k$ is the mixing coefficient, and $\mathcal{N}(x|\mu_k, \Sigma_k)$ is the component, where $\mu_k$ is the mean and $\Sigma_k$ is the covariance. The inverse of the covariance, $\Sigma_k^{-1}=\Lambda_k$, the precision matrix.

Figure 6:
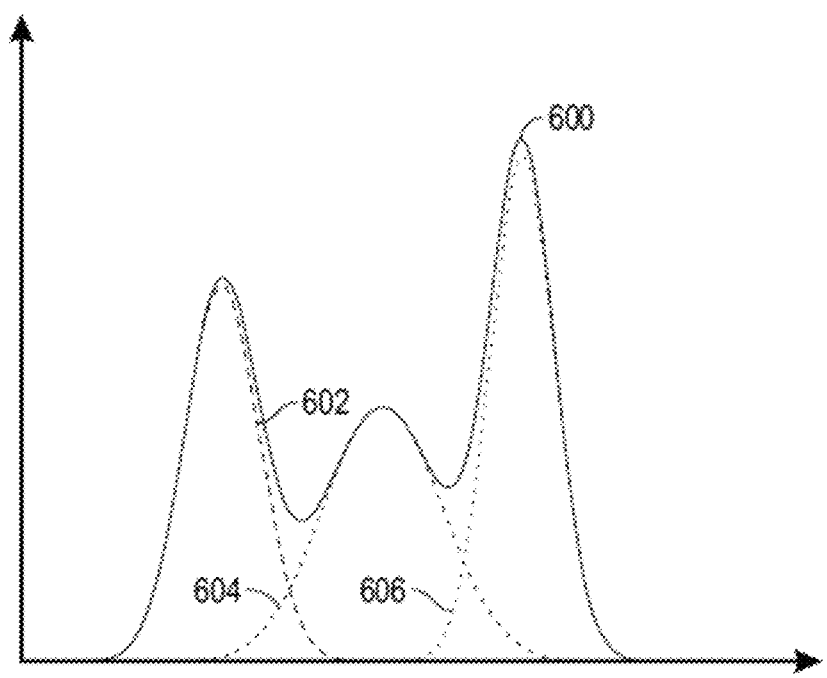
FIG. 6 depicts aspects of a Gaussian mixture model (GMM) usable with an aspect of the present invention.

FIG. 6 depicts aspects of a Gaussian mixture model (GMM) usable with an aspect of the present invention. The x-axis represents x, and the y-axis represents p(x), which may be a probability distribution. In FIG. 6, K=3, and the dashed lines indicate the 3 single component Gaussian distributions 602, 604, 606. The solid line indicates the GMM 600 composed of the weighted sum of components 602, 604, 606.

Conventionally, when using a GGM, the log-likelihood is maximized:

$$\max_{\pi,\mu,\Sigma} \log \mathcal{L}_P(\theta) = \sum_{n=1}^{N} \log\left(\sum_{k=1}^{K} \pi_k \mathcal{N}(x|\mu_k, \Sigma_k)\right)$$

The mixture weights are updated:

$$\max_{\pi} \sum_{k=1}^{K} r_k \ln \pi_k \text{ subject to } \sum_{k=1}^{K} \pi_k = 1$$

The covariances are updated:

$$\Sigma_k = \frac{1}{N_k} \sum_{n=1}^{N} r_{nk}(x_n - \mu_k)(x_n - \mu_k)^T$$

However, these techniques do not employ structured learning (e.g., sparsity and/or correlation). Irrelevant components can be removed by a sparse model. The sparse model may include sparse mixture weights $\pi_k$ and a sparse inverse covariance $\Sigma_k^{-1}$. The sparse mixture weights $\pi_k$ may provide an automatic determination of the number of patterns, while the sparse inverse covariance $\Sigma_k^{-1}$ and/or inverse precision matrix $\Lambda_k^{-1}$ may provide a sparse Guassian graphical model (GGM). Thus, the resulting model may be a multi-layer sparse mixture of sparse GGMs, which may include both sparsity in the dependency structure of the GGM and sparsity over the mixture components.

Figure 7:
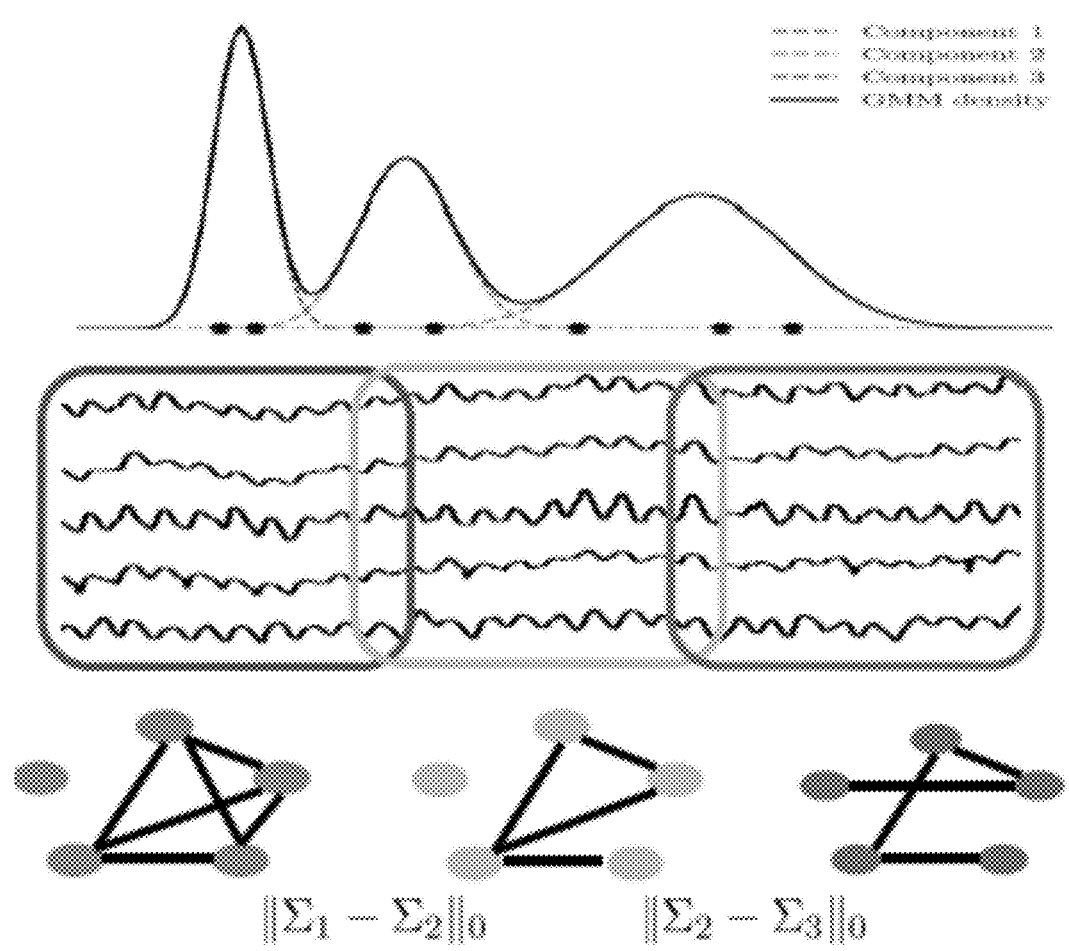
FIG. 7 depicts aspects of a temporal-coupling multimodal mixture model (TMM) in accordance with an aspect of the present invention.

As further discussed with reference to FIG. 7, illustrative embodiments of the invention use an exact nonconvex $\ell_0$ norm, rather than an approximate convex sparsity promoting $\ell_1$ norm, for $\Sigma_k^{-1}$. Embodiments of the present invention utilize a temporal coupling multi-modal mixture model (TMM). This model recognizes that an asset can be operated in different modes, but there are some similarities between them. The modes are gradually adjusted. The structures of dependency graphs should share some commonality.

FIG. 7 depicts aspects of a temporal-coupling multi-modal mixture model (TMM) in accordance with an aspect of the present invention. In FIG. 7, as in FIG. 6, the solid line denotes a Gaussian mixture model (GMM) which is composed of a weighted sum of three components denoted with dashed lines. However, in FIG. 7, these three components correspond to multivariate data composed of the same set of variables during different (possibly at least partially overlapping) windows of time. Thus, the Gaussian graphical model (GGM) representations of the three components of the GMM (which here is a TMM) each have the same set of nodes, with the only difference being the connections between the nodes.

As used herein, $|v_i|$ denotes the absolute value of the i-th element of vector v. A vector v is called an $\epsilon$-sparse solution if many elements satisfy $|v_i| \leq \epsilon$ for a small $\epsilon > 0$. $\|v\|_\epsilon$ denotes the $\epsilon$-norm, counting the number of entries $|v_i| > \epsilon$. For example, $\|v\|_0$ denotes the $\ell_0$ norm (number of nonzero elements) of vector v. As previously discussed, illustrative embodiments of the present invention use an exact nonconvex sparsity promoting $\ell_0$ norm for $\Sigma_k^{-1}$, as opposed to an approximate convex $\ell_1$ norm.

Accordingly, in a TMM according to an illustrative embodiment of the present invention, the constrained regularized log-likelihood is maximized:

$$\max_{\pi,\mu,\Sigma} \log \mathcal{L}_P(\theta) =$$

$$\sum_{n=1}^{N} \log \left( \sum_{k=1}^{K} \pi_k \mathcal{N}(x \mid \mu_k, \Sigma_k) \right) - \lambda \|\pi\|_\epsilon - \beta \sum_{k=1}^{K} 1_{\{\pi_k > \epsilon\}} 1_{\{\pi_{k+1} > \epsilon\}} \|\Sigma_k - \Sigma_{k+1}\|_0$$

where sparsity is directly constrained by specifying a maximally allowable number of nonzeros in the precision matrices $\|\Sigma_k\|_0 \leq \kappa_k$, $\forall k = 1, \ldots, K$. Unimportant components are pruned by the constraint $\|\pi\|_\epsilon \leq \kappa_\epsilon$.

Some structure similarity is imposed across dependency graphs for components. Only important components are constrained (e.g., only significant components are penalized), i.e., the mixture weight is significantly large:

$$\sum_{k=1}^{K} 1_{\{\pi_k > \epsilon\}} 1_{\{\pi_{k+1} > \epsilon\}} \|\Sigma_k - \Sigma_{k+1}\|_0$$

Sometimes, the data has been slightly changed, but there is no access to the original data. Some domain knowledge about the precision matrices may be known, such as a good model has been built to get matrices. One may set $\Sigma_k$ close to $\overline{\Sigma}_k$ by adding a regularization:

$$\beta \sum_{k=1}^{K} \|\Sigma_k - \overline{\Sigma}_k\|_F^2$$

Figure 8:
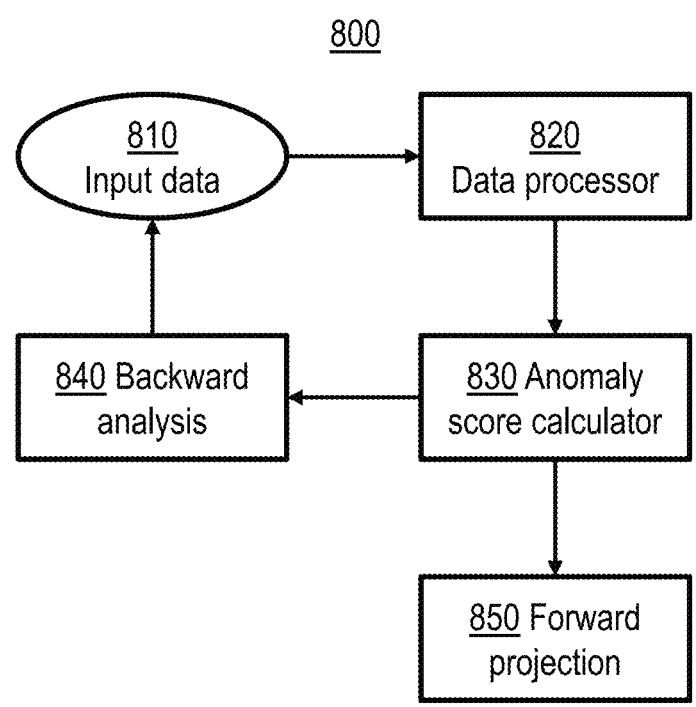
FIG. 8 shows an anomaly detection system in accordance with an aspect of the present invention.

FIG. 8 shows an anomaly detection system 800 in accordance with an aspect of the present invention. Input data 810 may comprise univariate data 510 or multivariate data 520 as discussed above with reference to FIG. 5. Input data 810 may be time series sensor data, which may be received in real time from one more sensors, e.g., within an IC fabrication processing system as discussed above with reference to FIGS. 1-4. Data processor 820 processes the input data 810, e.g., into one or more sparse graphical models, e.g., GGMs, GMMs, and/or TMMs, as discussed above with reference to 530 in FIG. 5, as well as with reference to FIGS. 6 and 7. Data processor 820 may also include converting input data 810 from univariate data 510 to multivariate data 520, as discussed above with reference to FIG. 5. Anomaly score calculator 830 calculates one or more anomaly scores 540, as discussed with reference to FIG. 5, based on the input data 810 and on models determined in step 820.

Backward analysis 840 is a backward prediction tool which may be used, e.g., for off-line diagnosis. For backward analysis, a data point $X^t$ may be considered in a three-dimensional space, comprising the observation value $x^t$, the timestamp t, and the minimum gap between the immediately preceding and following values: $\min(|x^t - x^{t-1}|, |x^t - x^{t+1}|)$. Backward analysis 840 may include a learned sparse mixture of sparse GMM from all data sets and/or a computed outlier score for each historical sample. Backward analysis may include observing the current state of an asset, learning a predictive model for the asset, and taking control actions to change characteristics of the asset. Thus, backward analysis 840 may include modifying input data 810, as previously discussed above with reference to FIG. 2 and further discussed below with reference to FIGS. 9 and 10. Backward analysis 840 is further discussed below with reference to FIGS. 15-19.

Forward projection 850 is a forward prediction tool which may be used, e.g., for on-line anomaly detection. Forward projection 850 may include serial testing, which trains on n-1 data points (see training data 570 in FIG. 5), then tests on the n-th instance (see testing data 590), and which may also include repeatedly calculating a time-varying score for the n-th point as more samples are received (e.g., from sensors). In forward analysis, a data point $X^t$ may be considered in a three-dimensional space, comprising the observation value $x^t$, the timestamp t, and the average gap between the observation value and one or more (preferably several, such as three) preceding values: $x^t$–average($x^{t-1}$, $x^{t-2}$, $x^{t-3}$), which is a specific case (N=3) of the more general formula:

$$x^t - \left(\frac{1}{N}\sum_{n=1}^{N} x^{t-N}\right)$$

Forward projection 850 is further discussed below with reference to FIGS. 20-22.

Figure 9:
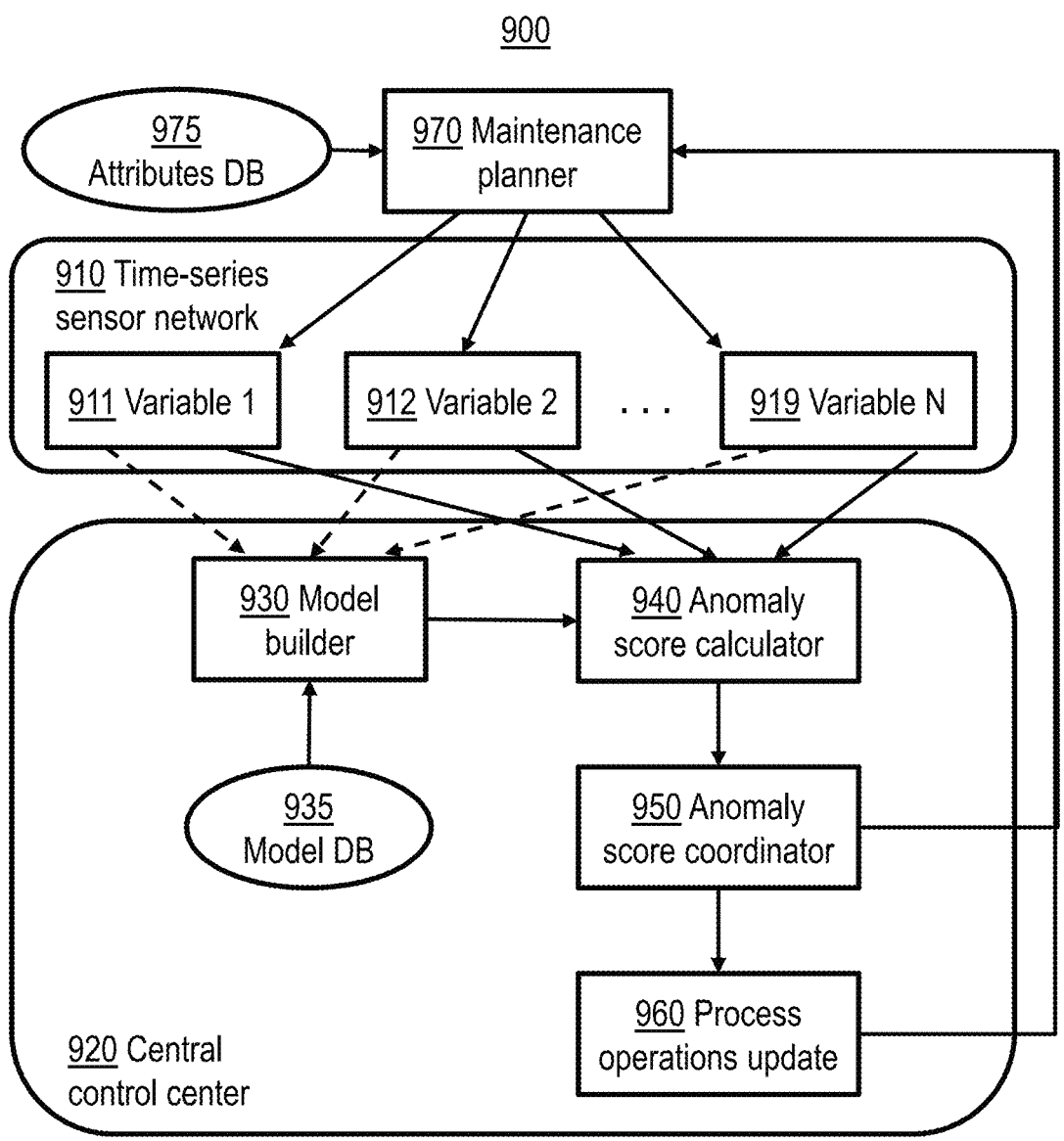
FIG. 9 shows a quality and yield improvement system (e.g., for semiconductor manufacturing) in accordance with an aspect of the present invention.

FIG. 9 shows a quality and yield improvement system 900 (e.g., for semiconductor manufacturing) in accordance with an aspect of the present invention. Time-series sensor network 910 connects individual sensors at each asset to a central control center 920 (a computer system) which may receive/store the time series data from each sensor, e.g. 911, 912, 913. By way of example, variable 911 may be a periodic related normal variable such as DC source voltage discussed above with reference to FIG. 4A, variable 912 may be a multimodal normal variable such as heat-up time discussed above with reference to FIG. 4B, and variable 913 may be a drifting normal variable such as motor position discussed above with reference to FIG. 4C.

Each asset may consist of many distinct parts, and individual parts may be monitored with multiple sensors. Since distinct parts in a system (asset) are not necessarily independent, signals from each sensor must be analyzed in a multivariate fashion. From the sensor network 910, multivariate time-series data associated with each individual asset are input to a computer system 920 providing a model build framework configured with a model builder module 930 configured to invoke instructions for building anomaly detection models for the assets, an anomaly score calculator module 940 configured to invoke instructions for computing one or more anomaly scores for assets that may indicate an anomalous/faulty operation, an anomaly score coordinator module 950 configured to invoke instructions for processing computed anomaly scores for purposes of conducting and prioritizing asset maintenance, and a process operations update module 960 configured to invoke instructions for processing updates to operations as discussed above with reference to FIGS. 2 and 8 and below with reference to FIG. 10.

A model database or like storage device 935 stores S anomaly detection models that have been provided by the model builder module 930, where S is the number of assets (systems or tasks) in the fleet. In one embodiment, the anomaly detection models learned are multi-task, multi-modal Gaussian graphical models (MTL-MM GGM models) and/or temporal-coupling multi-modal mixture models (TMMs). More generally, the anomaly detection models may be Gaussian mixture models (GMMs) and/or Gaussian graphical models (GGMs).

In one embodiment, the building of a model by model builder 930 may include computing a combination of two model components: (1) S sets of sparse mixture weights and (2) one set of sparse GGMs 330. The former can be different from asset to asset, and thus represents individuality of the assets in the fleet. The latter is shared with the S assets and thus represents commonality across the S assets. The individually sparse mixture weights for an asset specify the importance of the GGMs. That is, computed weights function as a selector of the GGMs in the database 935 and different sensors 921, 922, 923 have different weights or signature weight distributions. These weights will generally have many zeros for robustness and interpretability and are automatically learned from data, e.g., based on a Bayesian formulation. Thus, for each asset, model builder 930 may use mixture weight learning to optimally build a learned model based on a representation combining a common collection of sparse GGMs as a basis set and individual sparse mixture weights providing a sparse solution for the mixture weights, by which the number of sparse GGMs in the database 935 may be automatically determined. Using a semi-closed form solution and a convex mixed-integer programming formulation, in an illustrative embodiment, model builder 930 is fast, accurate (a global solution is provided) and simple in that it does not use any "hidden" parameters to truncate least contributed weights.

Given the learned models, during an "on-line" process, the anomaly score calculator 940 receives the multivariate signals 921, 922, 923 and computes anomaly scores at predefined times, e.g., periodically, such as once every 15 minutes. Anomaly calculator module 940 may produce an anomaly score for the entire system and for each sensor. In one embodiment, the anomaly score calculator module 940 receives current (on-line) samples 921, 922, 923 of recent multivariate sensor data from time-series sensor network 920 and using the received data of a present time window, implements steps described above with reference to FIG. 5 for generating an overall anomaly score 540 for the system. In addition, module 930 may further process the most recent multivariate data corresponding to recent time-series data from each of the sensors of that system and generate individual "per-variable" anomaly scores for each variable to indicate the dynamic behavior or "health" of that system. As will be described, the generating of the scores may involves the automated solving (updating) of a model 530 which may be a doubly sparse mixture model associated with that system.

Anomaly score coordinator module 950 may implement functions for ranking the overall and per-variable anomaly scores for each asset and for comparing each score against a set of thresholds provided by model builder 950. If some anomaly scores are greater than the thresholds, this may indicate a possible malfunction with that asset and module 950 generates signals indicating those asset(s) and corresponding score(s). In one embodiment, these signals may be automatically communicated to a maintenance planner module 970, at a same or external computing system, which runs instructions for scheduling and prioritizing maintenance actions.

In one embodiment, when an anomaly score for an asset is determined as exceeding a threshold, which may be derived from historical anomalous values, the output signal indicates the overall anomaly score for the individual asset. There are further compared individual "per variable" anomaly scores determined for each sensor variable of that particular asset against threshold values for each of those corresponding sensor variables determined, e.g., based on a quantile value for each variable. The result of a per variable comparison exceeding a certain threshold will indicate a particular sensor corresponding to that variable or a component that may be operating in an anomalous way based on that variable score. The thresholds of overall and per-variable anomaly scores can be determined by computing the scores against a data set acquired under a normal condition. Specifically, the threshold can be determined as, e.g., the 95 percent quantile or more simply as the maximum value of the anomaly scores under the normal condition. Thus, output signals may further be generated to indicate the variable and/or sensor associated with a particular component that has most likely contributed to the potential failure for that asset. From the asset data represented in the signals, it can be determined what component of that asset may need immediate maintenance.

Process operations update module 960 updates the tool condition and recipe, incoming (partially finished) product characteristics, and other data. Process operations update module 960 then passes the updated data to maintenance planner 970. Maintenance planner module 970 may run instructions for prioritizing maintenance actions. Maintenance planner 970 may determine a need for instructing or flagging a service interruption for repairing particular potentially troublesome parts of the assets (systems), depending on the severity and resource availability, as well as values retrieved from attributes database 975. For example, a new part or component or sensor may have to be replaced in a particular asset to address an issue as determined by a per-variable anomaly score, discussed later with reference to anomaly score coordinator 950. In one embodiment, maintenance planner module 970 may automatically generate further signals embodying messages to flag or schedule a service interruption, repair, or other type of maintenance for the potentially anomalous asset.

Figure 10:
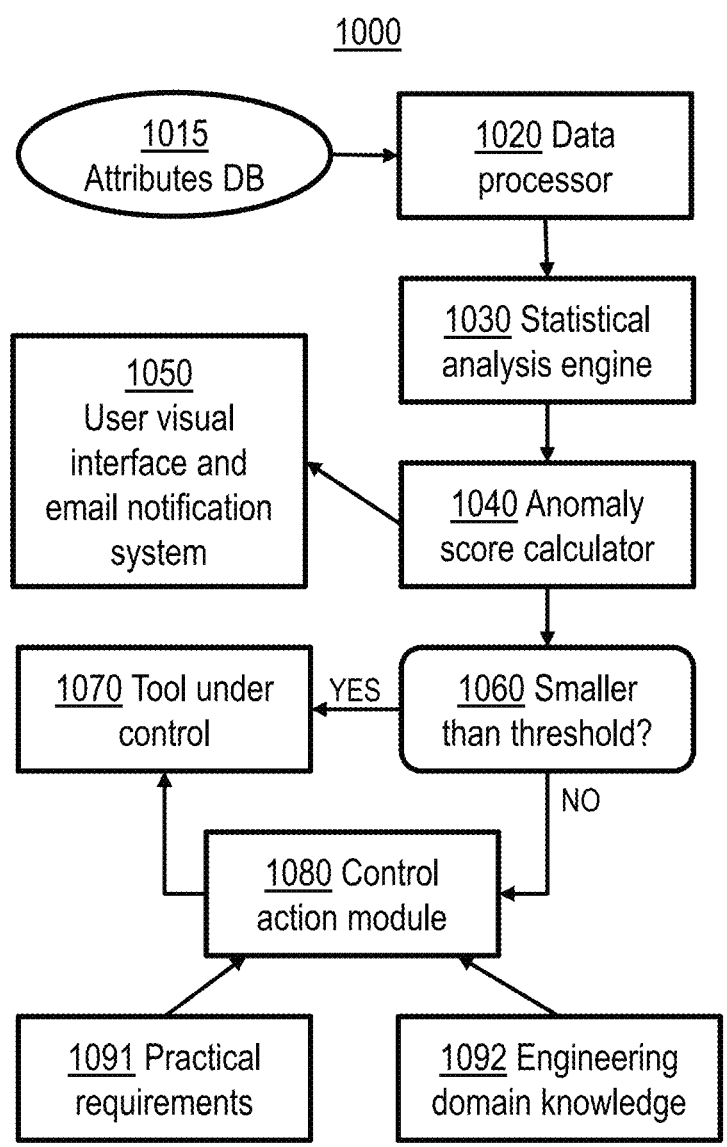
FIG. 10 shows a system for observing and changing characteristics of an asset in accordance with an aspect of the present invention.

FIG. 10 shows a system for observing and changing characteristics of an asset in accordance with an aspect of the present invention. Data processor 1020, which may be generally analogous to 820 in FIG. 8, retrieves input data 810 from attributes database 1015, which may be generally analogous to 975 in FIG. 9.

Statistical analysis engine 1030 may be generally analogous to model builder 930 in FIG. 9, and anomaly score calculator 1040 may be generally analogous to 940 and/or 950 in FIG. 9. Statistical analysis engine may be operative to detect outliers for batch of processed wafers using sparse GMM or GPR (Gaussian Process Regression). Anomaly score calculator 1040 may be operative to use single or multiple sensor measurements with sparse GMM to compute anomaly scores for historical data or immediate samples, and to predict next wafer measurement based on previous measurements.

At least a portion of the output generated by anomaly score calculator 1040 (e.g., at least a portion of the output(s) discussed with reference to 940 and/or 950 in FIG. 9) may be communicated to a user through a visual interface (e.g., graphical user interface) and/or email notification system 1050. Module 1060 determines whether the anomaly score is smaller than a threshold, in a manner similar to that discussed above with reference to 950 in FIG. 9. If the anomaly score is smaller than the threshold, then the tool under control 1070 is operating normally.

If the anomaly score exceeds the threshold, then the control action module 1080 modifies one or more operational parameters of the tool under control 1070, for example, based at least in part on practical requirements 1091 and/or engineering domain knowledge 1092. Control action module may be generally analogous to 960 and/or 970 in FIG. 9. Thus, module 1060 may be operative to comparing the prediction (from module 1040) with a subsequent measurement using GPR to determine if the actual measurement is anomalous. If an anomalous measurement is identified in 1060, module 1080 may be operative to take remedial action.

FIG. 11 shows a multi-model graphical model (MGM) algorithm in accordance with an aspect of the present invention, which at line 1111 calls the inverse covariance update (ICU) algorithm shown in FIG. 12. This ICU algorithm at line 1202 calls the temporal ordering clustering (TOC) algorithm shown in FIG. 13. FIG. 14 shows a sparse weight selection algorithm (SWSA) in accordance with an aspect of the present invention, which is used to solve for $\pi$ in line 1110 of FIG. 11.

Illustrative embodiments of the present invention advantageously leverage unsupervised Gaussian mixture models (GMMs), and more particularly temporal-coupling multimodal mixture models (TMMs), to provide quality improvement for non-stationary systems. Illustrative embodiments provide a predictive model to detect outliers and anomalies for non-stationary systems with temporal information, e.g., one or more temporal predictor variables. Illustrative embodiments automatically capture multiple normal operational states, adapt models to drifts and shifts, and respect temporal order of observations. Illustrative embodiments are also robust to noise and highly interpretable for diagnosis purposes.

Illustrative embodiments provide a novel multi-modal predictive model for learning a density function for non-stational systems by using a graphical mixture model. Illustrative embodiments take into account the temporal order of samples and enforce structure similarity across different operating modes, e.g., dependency graphs for components. The sparsity for precision matrices can be handled via a $\ell_0$ norm, and domain knowledge can be incorporated into the model. Illustrative embodiments also provide an optimization algorithm to train the model, as well as backward and forward prediction tools for off-line diagnosis and on-line anomaly detection. These tools may include converting a time-series univariate data into a multivariate (e.g., three-dimensional) data. These tools may additionally or alternatively include updating an abnormal score when more observations are obtained.

Figure 15A:
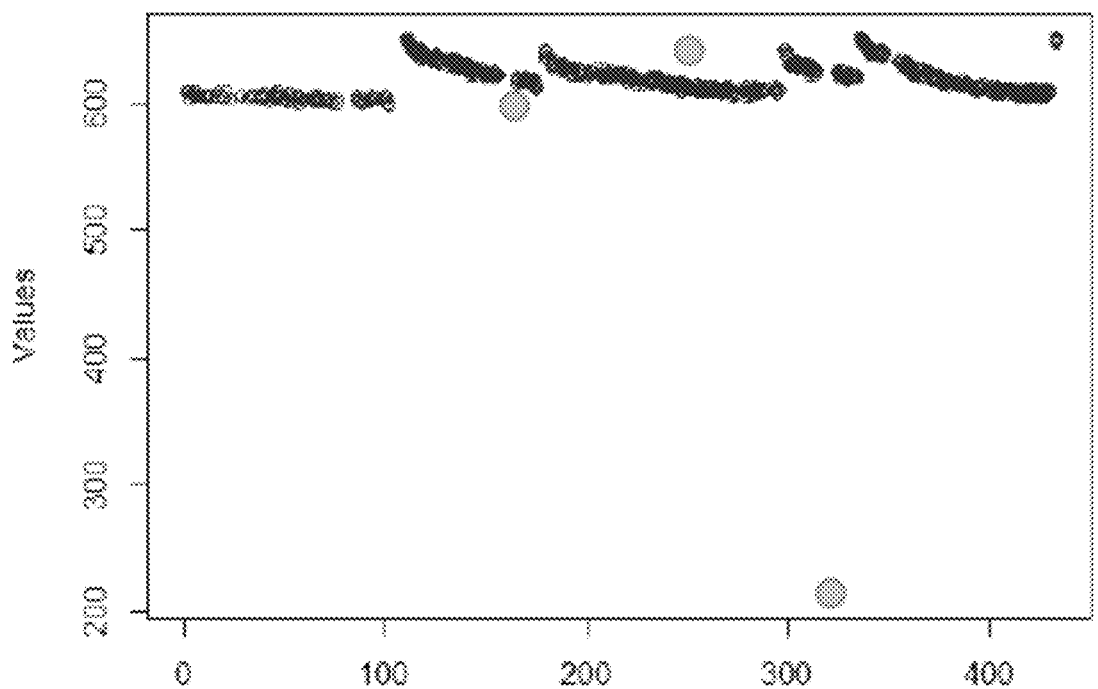
FIG. 15A shows univariate trace feature data usable with an embodiment of the present invention.

FIG. 15A shows univariate trace feature data usable with an embodiment of the present invention. FIG. 15A shows voltage values (y-axis) in Step 7 for successively-processed wafers (x-axis) which, as discussed above with reference to FIG. 4A, is a periodic related normal variable. The squares in FIG. 4A may correspond to a subset of the hollow circles in FIG. 15A. Like FIG. 4A, FIG. 15 includes outliers shown as filled circles rather than hollow circles (or squares). Specifically, FIG. 15A shows 931 samples of mean voltage for Chamber 1 during Halo Paste (AT/CH1/DCSrc.rVoltage)_ mean, including 3 outliers.

Figure 15B:
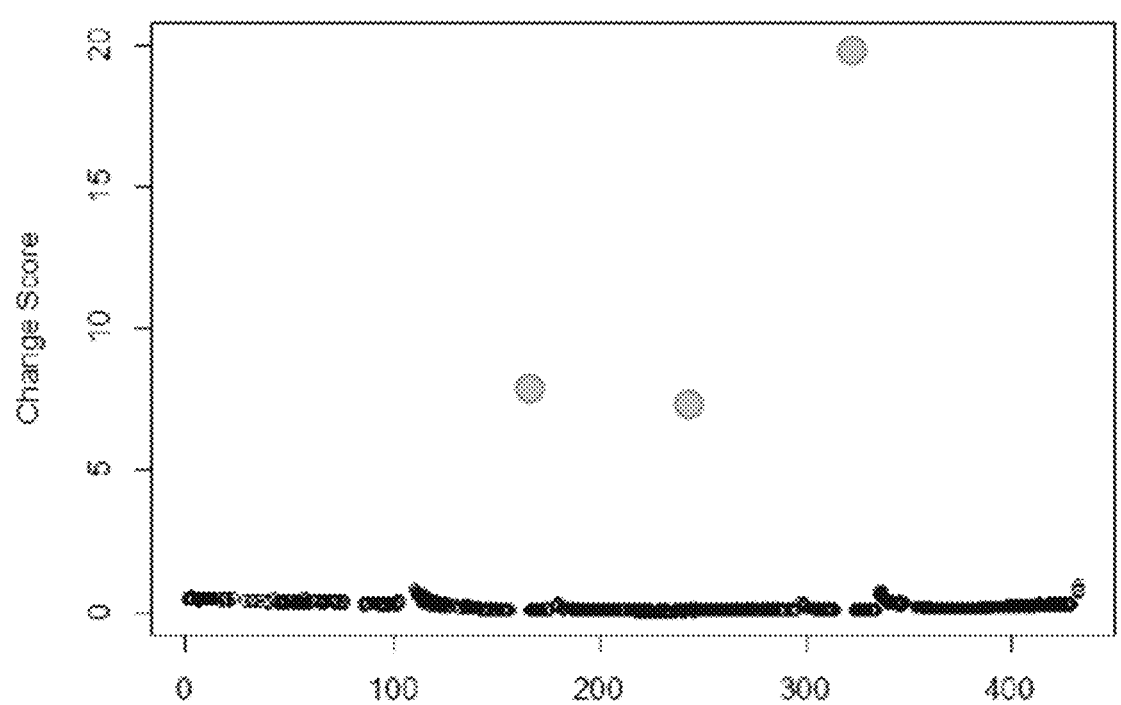
FIG. 15B shows experimental results for backward analysis of univariate trace feature data with GMM in accordance with an embodiment of the present invention.
Figure 15C:
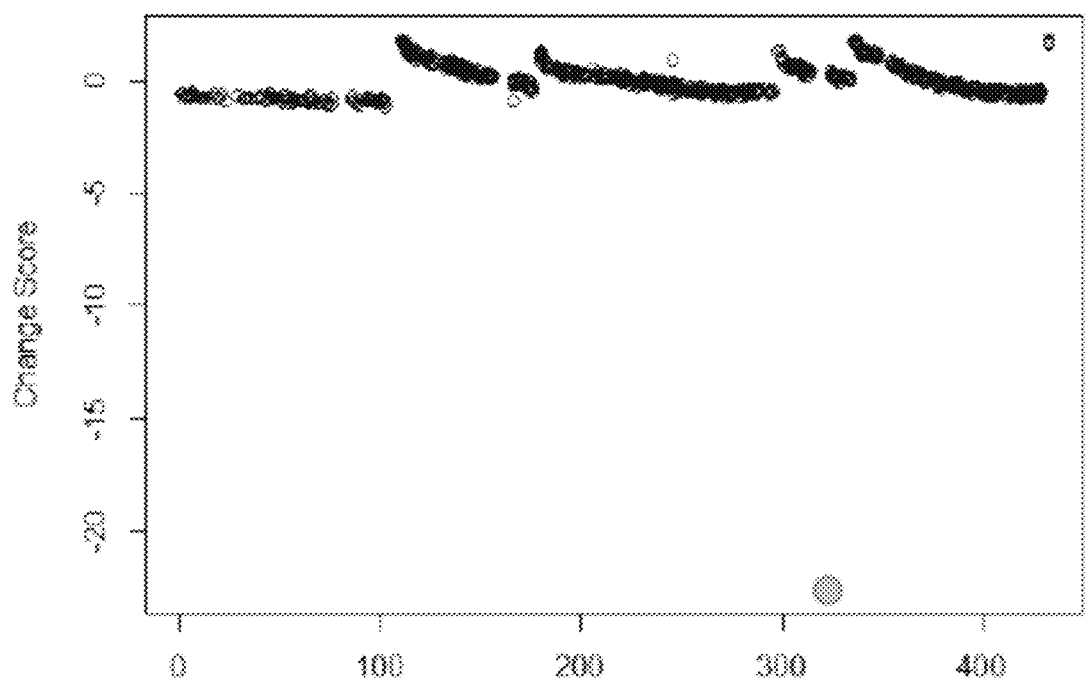
FIG. 15C shows experimental results for backward analysis of univariate trace feature data with Z-score.
Figure 15D:
FIG. 15D shows experimental results for backward analysis of univariate trace feature data in accordance with boxplot.

FIGS. 15B-15D show experimental results for backward analysis of the univariate trace data shown in FIG. 15A. The experimental design was intended to detect outliers, compare counts, and visualize differences. FIG. 15B shows the experimental results for backward analysis of univariate trace feature data with GMM in accordance with an embodiment of the present invention. FIG. 15B is a visualization of change scores (y-axis) in Step 7 for successively-processed wafers (x-axis). As shown by the filled circles in FIG. 15B, an illustrative embodiment of the present invention correctly identified the 3 outliers present within the univariate trace feature data in FIG. 15A. When compared to conventional techniques such as Z-score and boxplot, only the inventive technique using GMM correctly identified the 3 outliers within the univariate trace feature in FIG. 15A.

FIG. 15C shows experimental results for backward analysis of univariate trace feature data with Z-score. A z-score, or standard score, shows how many standard deviations below or above the mean a given data point is. FIG. 15C is a visualization of change scores (y-axis) in Step 7 for successively-processed wafers (x-axis). As shown by the filled circle in FIG. 15C, this conventional technique only identified 1 outlier, rather than the 3 outliers present within the univariate trace feature data in FIG. 15A.

FIG. 15D shows experimental results for backward analysis of univariate trace feature data in accordance with boxplot. Like FIG. 15A, FIG. 15D shows observed voltage values (y-axis) om Step 7 for successively-processed wafers (x-axis). In the boxplot shown in FIG. 15D, the horizontal dashed lines 1514, 1515, and 1516 respectively represent the first quartile (25th percentile), second quartile (50th percentile or mean), and third quartile (75th percentile) values within the data set. As shown by the filled circle in FIG. 15D, this conventional technique only identified 1 outlier (wafer 647), rather than the 3 outliers present within the univariate trace feature data in FIG. 15A.

Figure 16A:
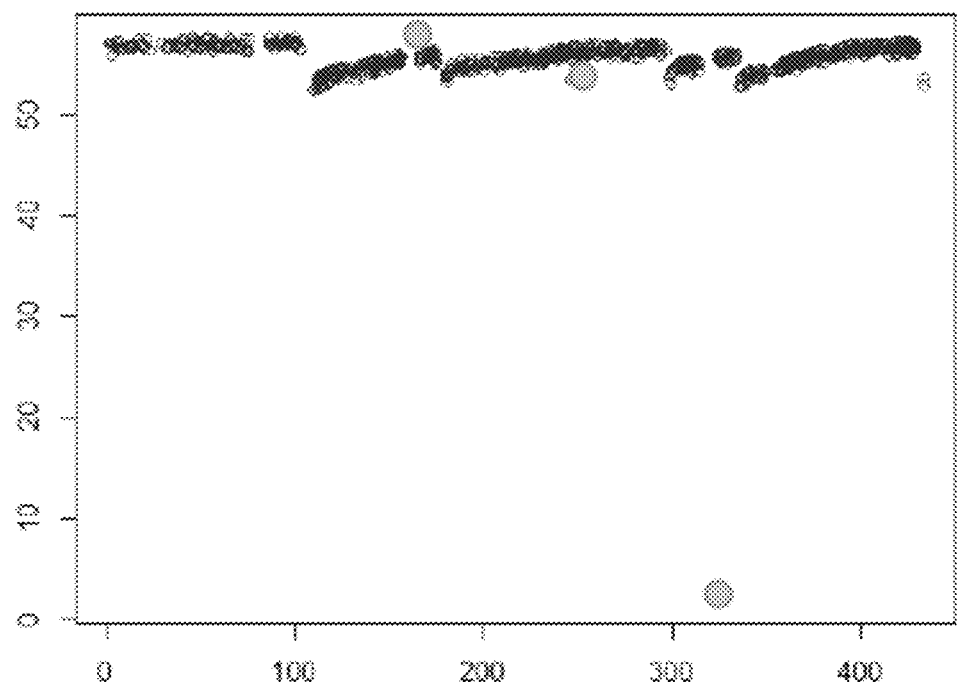
FIGS. 16A and 16B show multivariate trace feature data usable with an embodiment of the present invention.
Figure 16B:
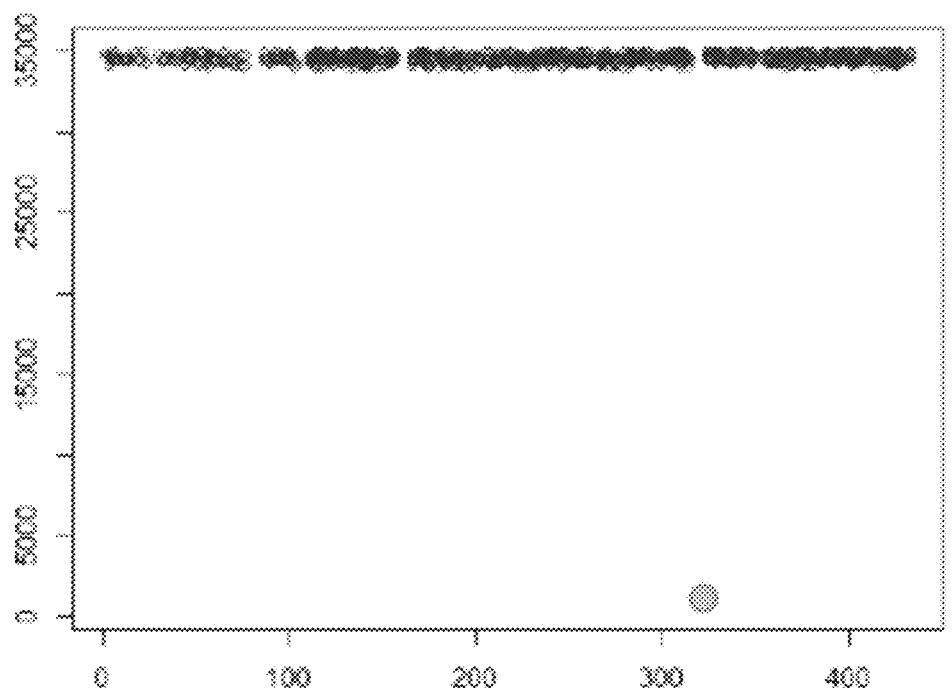

FIGS. 16A and 16B show multivariate trace feature data usable with an embodiment of the present invention. More particularly, FIGS. 16A and 16B show values of additional variables in Step 7 (y-axis) for the same successively-processed wafers (x-axis) as FIG. 15A. As previously noted, FIG. 15A shows voltage values (y-axis) in Step 7 for successively-processed wafers (x-axis) which, as discussed above with reference to FIG. 4A, is a periodic related normal variable (hollow circles) with 3 outliers (filled circles). FIG. 16A shows current values (y-axis) in Step 7 for successively processed wafers (x-axis) which is another periodic related normal variable (hollow circles) with outliers (filled circles) at the same 3 wafers as in FIG. 15A. FIG. 16B shows power values (y-axis) in Step 7 for successively processed wafers (x-axis) which is a normal variable with an outlier at 1 of the 3 wafers which were outliers in FIG. 15A and FIG. 16A.

FIGS. 15A, 16A, and 16B each show univariate trace feature data. However, FIGS. 15A, 16A, and 16B show values of different variables (y-axis) for the same processing step (Step 7) for the same wafers (x-axis). Thus, FIGS. 15A, 16A, and 16B could be viewed as 3 dimensions of multivariate trace feature data. When FIGS. 15A, 16A, and 16B are combined, the resulting multivariate trace feature data has 3 outliers: wafers 267, 470, and 647, each of which is an outlier for at least one of the 3 dimensions.

Figure 17A:
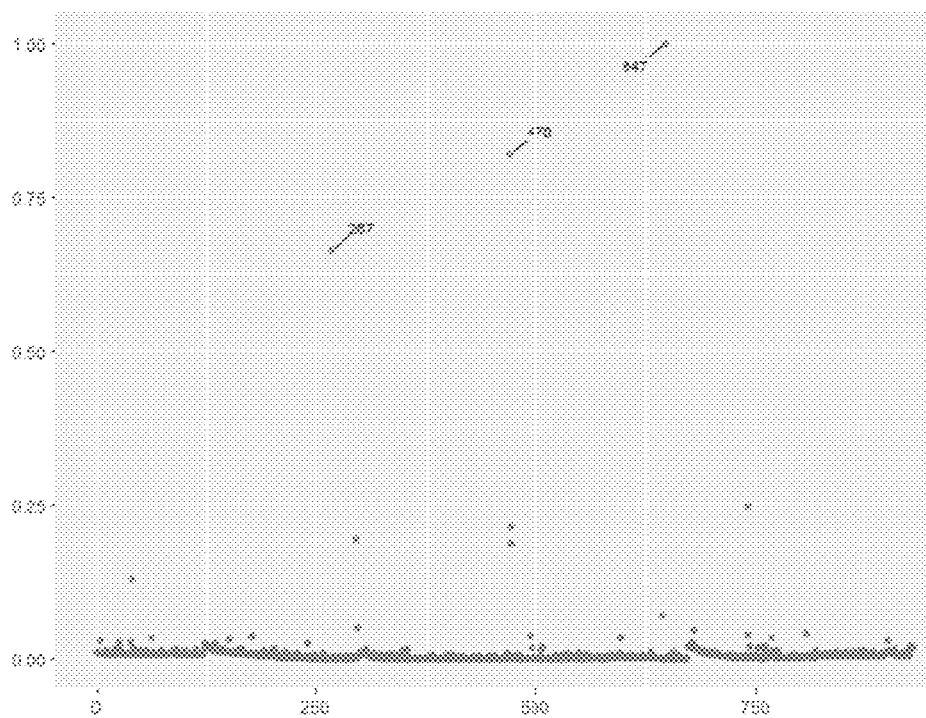
FIG. 17A shows experimental results for backward analysis of three-dimensional trace feature data with GMM in accordance with an embodiment of the present invention.

FIG. 17A shows experimental results for backward analysis of three-dimensional trace feature data with GMM in accordance with an embodiment of the present invention. The illustrative embodiment of the present invention correctly identified the 3 outliers (wafers 267, 470, and 647) present within the three-dimensional multivariate trace feature data collectively shown in FIGS. 15A, 16A, and 16B.

Figure 17B:
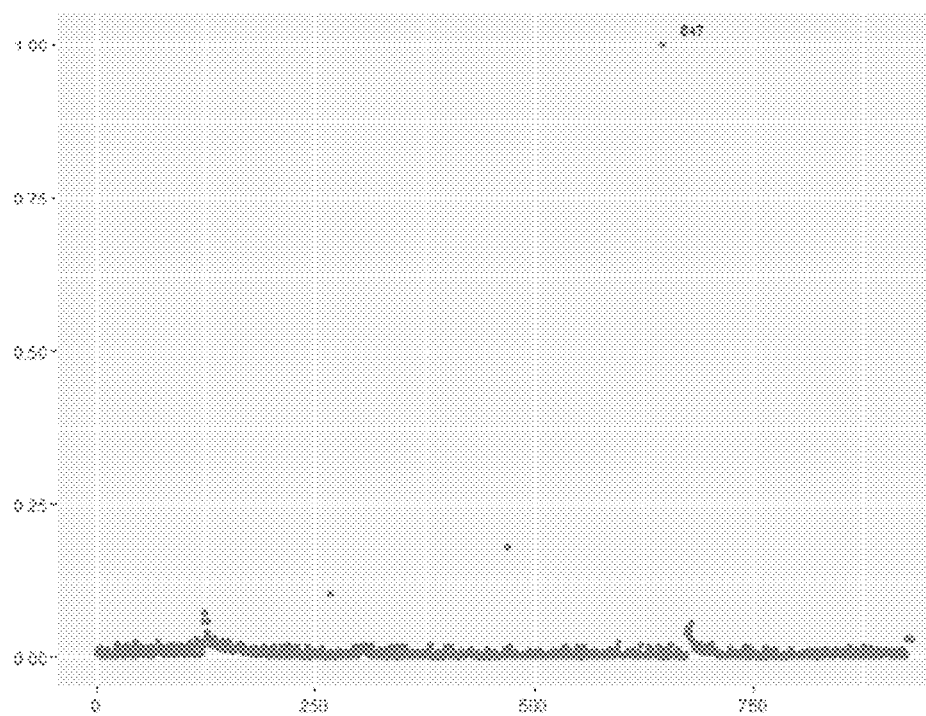
FIG. 17B shows experimental results for backward analysis of three-dimensional trace feature data with Hotelling's T-squared ($T^2$) statistic.

FIG. 17B shows experimental results for backward analysis of three-dimensional trace feature data with Hotelling's T-squared ($T^2$) statistic. This conventional technique only identified 1 outlier (wafer 647) of the aforementioned 3 outliers (wafers 267, 470, and 647) present within the three-dimensional multivariate trace feature data collectively shown in FIGS. 15A, 16A, and 16B.

Figure 18A:
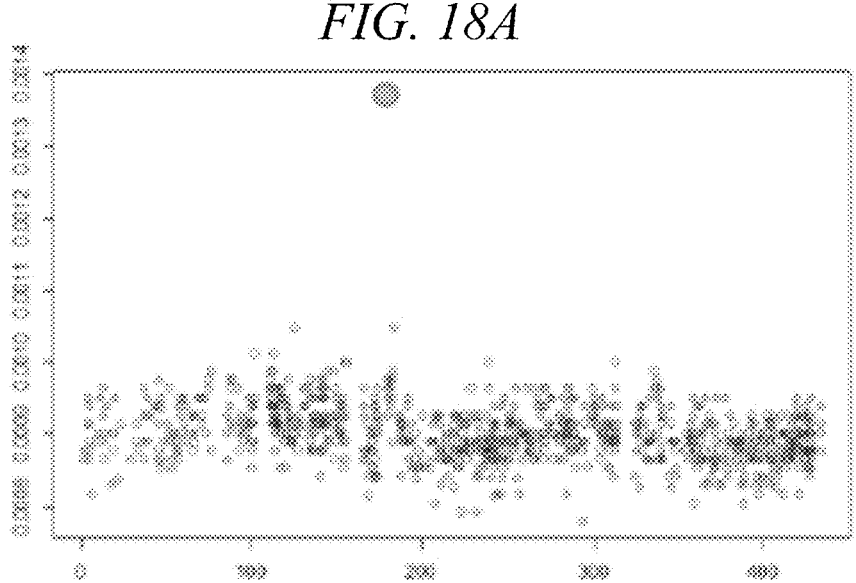
FIGS. 18A-C show multivariate trace feature data usable with an embodiment of the present invention.
Figure 18B:
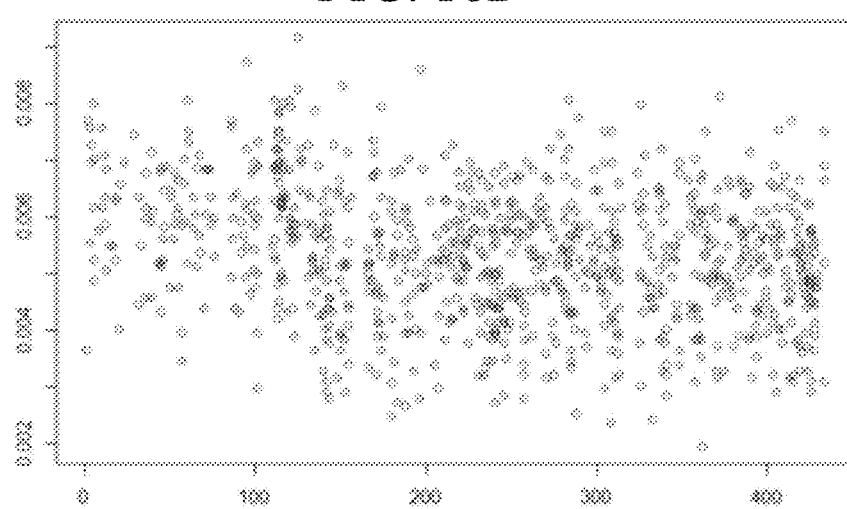
Figure 18C:
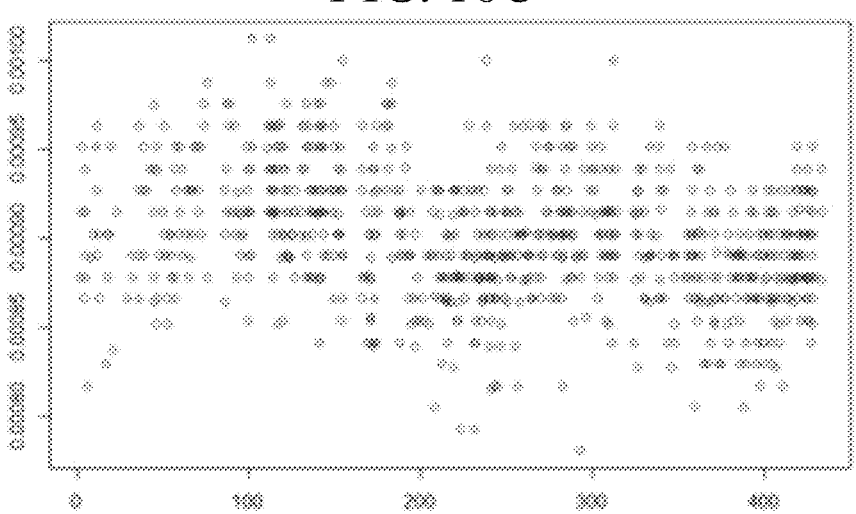

FIGS. 18A-C show multivariate trace feature data usable with an embodiment of the present invention. More particularly, FIGS. 18A-C show values of additional variables in Step 7 (y-axis) for the same successively-processed wafers (x-axis) as FIGS. 15A, 16A, and 16B. FIG. 18A shows pressure values (y-axis) in Step 7 for successively processed wafers (x-axis) which is a normal variable (hollow circles) with an outlier at wafer 307, a wafer which was not an outlier in FIG. 15A, 16A, or 16B. FIG. 18B shows current (AT.CH1.EMCoils.BOM) values (y-axis) in Step 7 for successively processed wafers (x-axis) which is a normal variable (hollow circles) with no outliers (filled circles). FIG. 18C shows backside gas pressure values (y-axis) in Step 7 for successively processed wafers (x-axis) which is a normal variable (hollow circles) with no outliers (filled circles).

Like FIGS. 15A, 16A, and 16B, FIGS. 18A-18C each show univariate trace feature data. However, FIGS. 15A, 16A, 16B, and 18A-18C show values of different variables (y-axis) for the same processing step (Step 7) for the same wafers (x-axis). Thus, FIGS. 15A, 16A, 16B, and 18A-18C could be viewed as 6 dimensions of multivariate trace feature data. When FIGS. 15A, 16A, 16B, and 18A-18C are combined, the resulting multivariate trace feature data has 4 outliers: wafers 267, 307, 470, and 647, each of which is an outlier for at least one of the 6 dimensions.

Figure 19A:
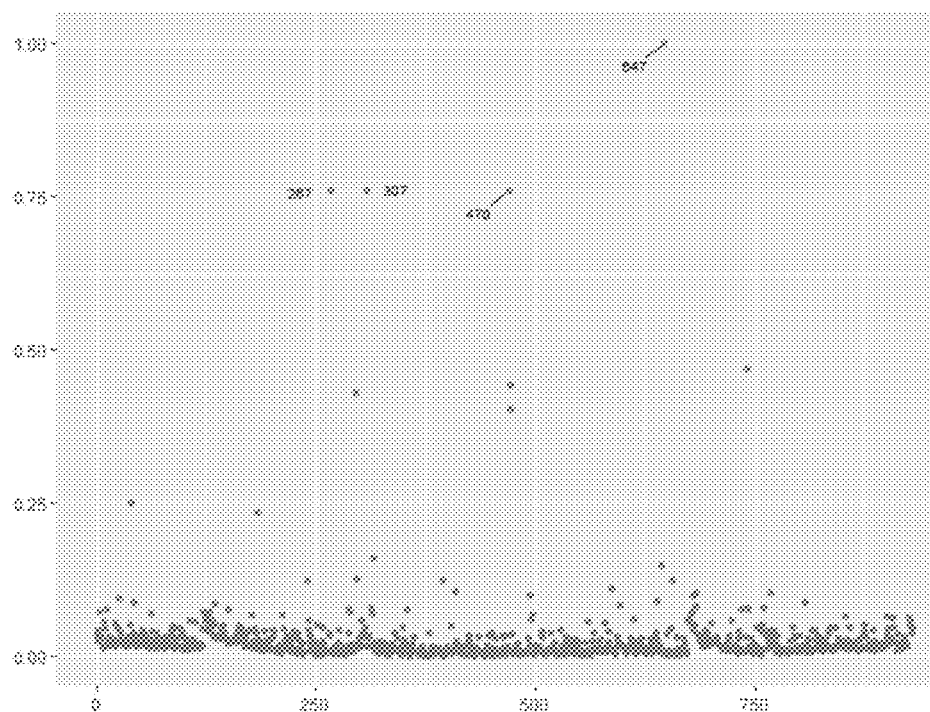
FIG. 19A shows experimental results for backward analysis of six-dimensional trace feature data with GMM in accordance with an embodiment of the present invention.

FIG. 19A shows experimental results for backward analysis of six-dimensional trace feature data with GMM in accordance with an embodiment of the present invention. The illustrative embodiment of the present invention correctly identified the 4 outliers (wafers 267, 307, 470, and 647) present within the six-dimensional multivariate trace feature data collectively shown in FIGS. 15A, 16A, 16B, and 18A-18C.

Figure 19B:
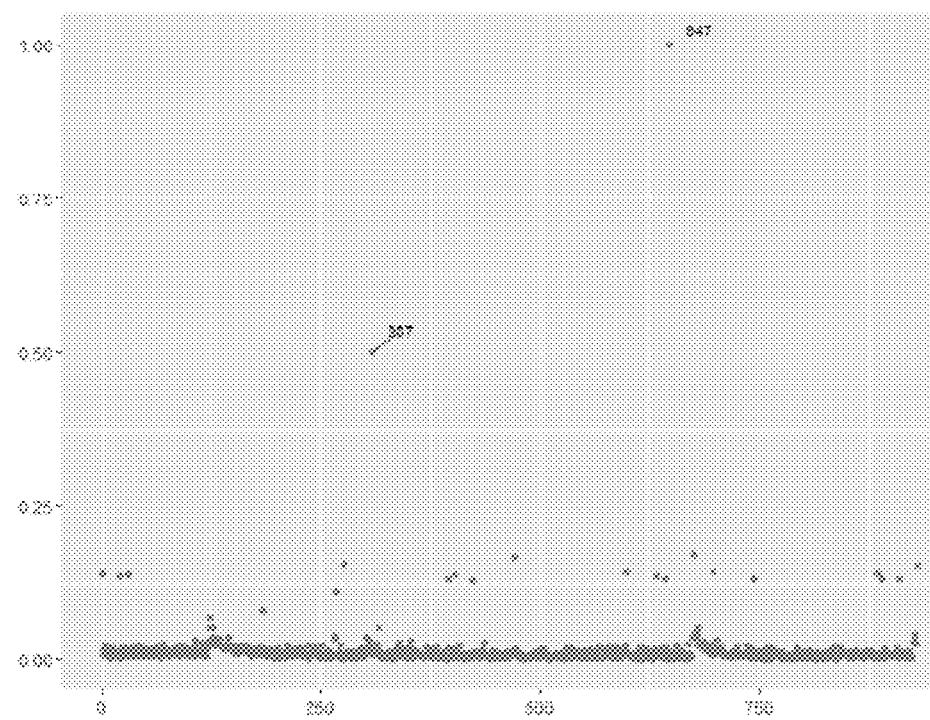
FIG. 19B shows experimental results for backward analysis of six-dimensional trace feature data with Hotelling's T-squared ($T^2$) statistic.

FIG. 19B shows experimental results for backward analysis of six-dimensional trace feature data with Hotelling's T-squared ($T^2$) statistic. This conventional technique only identified 2 outliers (wafers 307 and 647) of the aforementioned 4 outliers (wafers 267, 307, 470, and 647) present within the three-dimensional multivariate trace feature data collectively shown in FIGS. 15A, 16A, 16B, and 18A-18C.

Figure 20A:
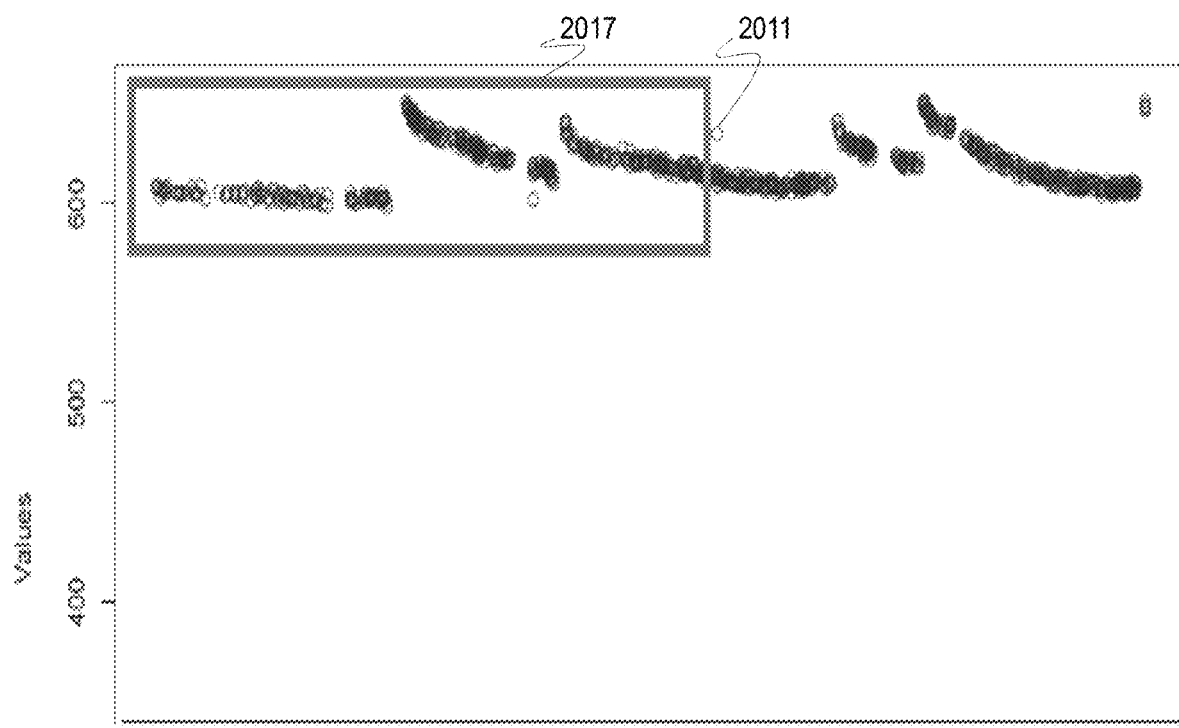
FIGS. 20A-20C shows serial testing of a time-varying score in accordance with an embodiment of the invention.
Figure 20B:
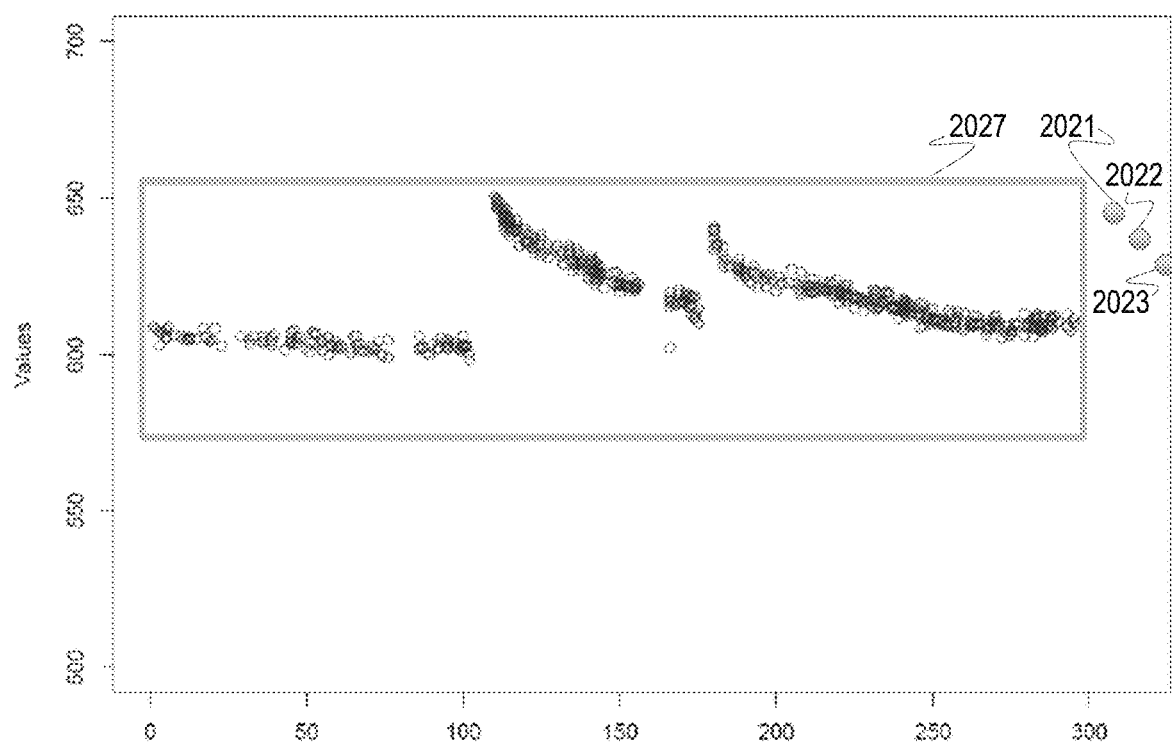
Figure 20C:
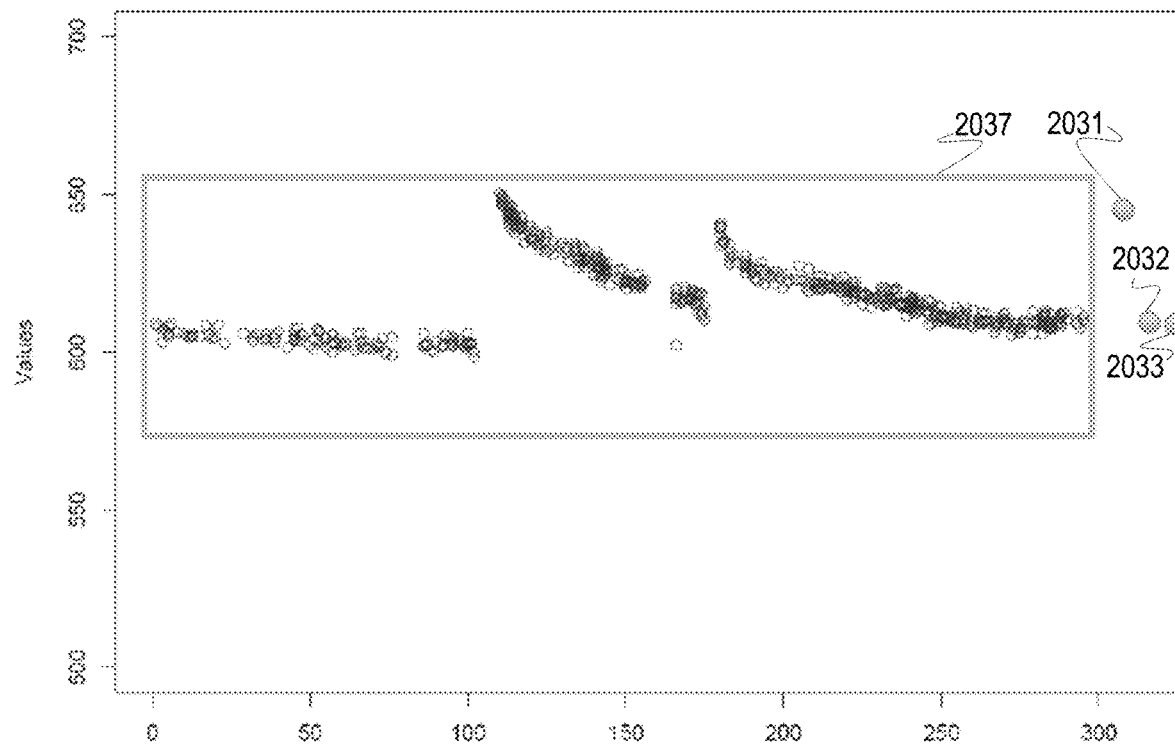

FIGS. 20A-20C shows serial testing of a time-varying score in accordance with an embodiment of the invention. Specifically, FIG. 20A shows univariate trace data similar to that discussed above with reference to FIG. 15A. As discussed above with reference to FIG. 8, forward projection 850 may include serial testing, which trains on n-1 data points, then tests on the n-th instance. In FIG. 20A, these n-1 data points are denoted as training set 2017, which may correspond generally to training data 570 in FIG. 7, while the n-th instance is denoted as testing point 2011, which may correspond generally to testing data 590 in FIG. 7.

As discussed above with reference to FIG. 8, forward projection 850 may also include repeatedly calculating a time-varying score for the n-th point as more samples are received (e.g., from sensors). In FIG. 20B, training set 2027 and testing point 2021 correspond to 2017 and 2011 in FIG. 20A. However, the score for testing point 2021 is recalculated after receiving subsequent data points (e.g., observations and/or samples) 2022 and 2023, which have values steadily decreasing relative to 2021, thus showing that testing point 2021 is not an outlier, but rather is part of a periodic related normal pattern similar to that discussed above with reference to FIG. 4A.

In FIG. 20C, as in FIG. 20B, training set 2037 and testing point 2031 correspond to 2017 and 2011 in FIG. 20A, and the score for testing point 2031 is recalculated after receiving subsequent data points (e.g., observations and/or samples) 2032 and 2033. Here, however, subsequent samples 2032 and 2033 have values similar to the data points immediately preceding 2031 (and dissimilar to 2031), thus showing that testing point 2031 is not part of a periodic related normal pattern, but rather is an outlier.

Figure 21A:
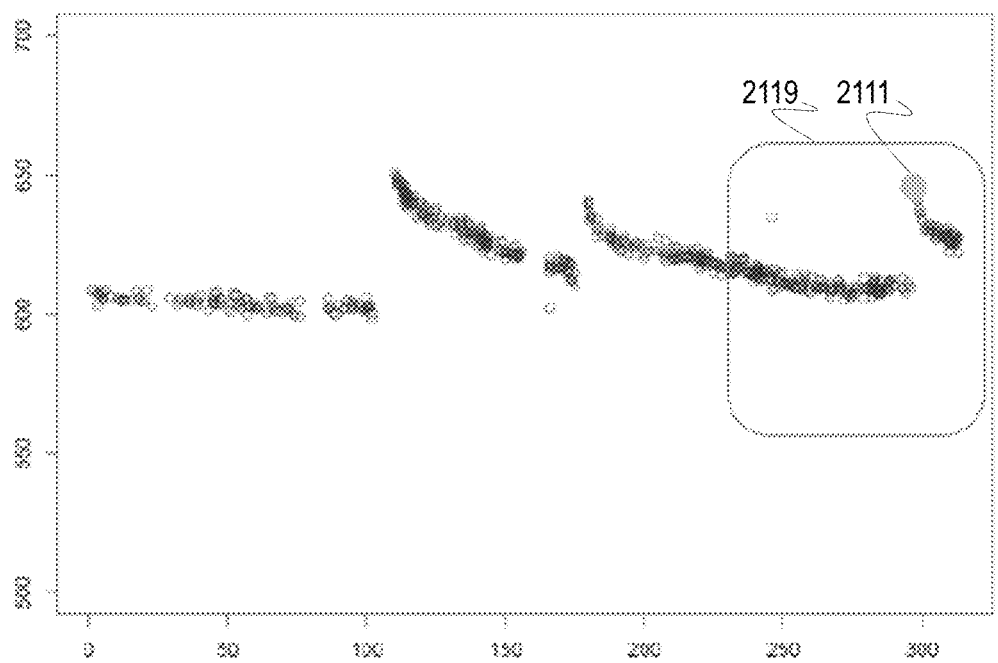
FIG. 21A shows univariate trace feature data usable with an embodiment of the present invention.

FIG. 21A shows univariate trace feature data usable with an embodiment of the present invention. Specifically, FIG. 21A shows data similar to that discussed above with reference to FIGS. 15A, 20A, and 20B. Here, testing point 2111 corresponds to testing point 2011 in FIG. 20A and testing point 2021 in FIG. 20B, with subsequent points steadily decreasing relative to testing point 2111 and thus showing that testing point 2111 is part of a periodic related normal pattern rather than an outlier. In FIG. 21A, testing window 2119 includes some points preceding and all points following testing point 2111, as opposed to training set 2017 in FIG. 20A, which includes all points preceding and no points following testing point 2011.

Figure 21B:
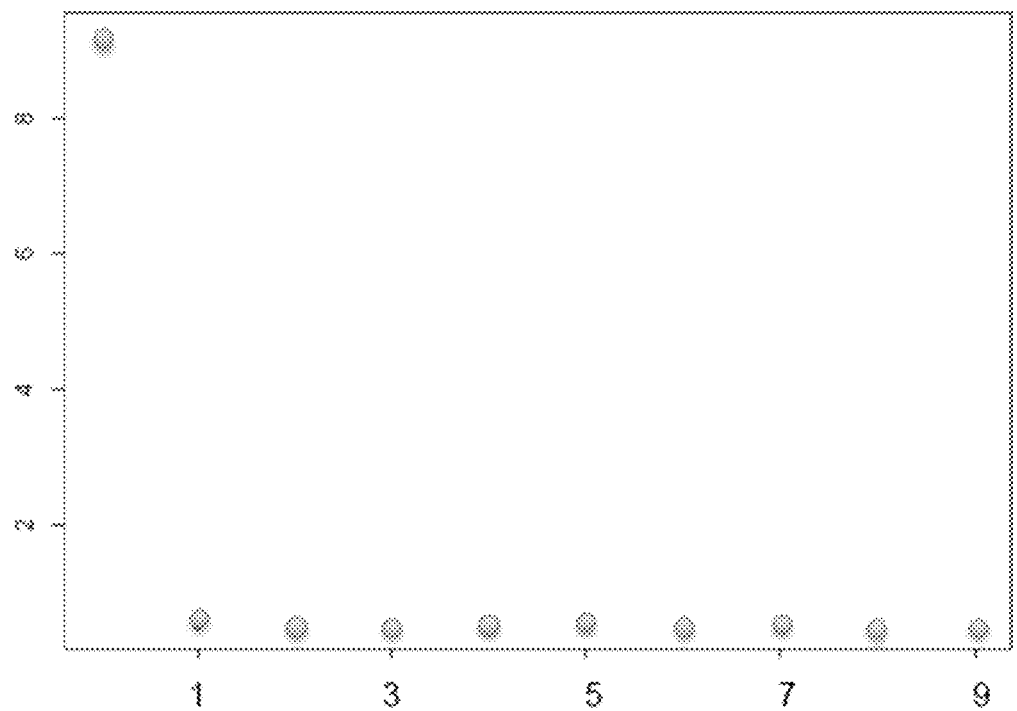
FIG. 21B shows experimental results for forward projection of univariate trace feature data with GMM in accordance with an embodiment of the present invention.

FIG. 21B shows experimental results for forward projection of univariate trace feature data with GMM in accordance with an embodiment of the present invention. More particularly, FIG. 21B shows the manner in which the change score (shown on the y-axis) for testing point 2111 is recalculated after a number of subsequent data points (shown on the x-axis) are received. Testing point 2111 is initially determined to be an outlier as it is significantly (e.g., more than 1 standard deviation) above the mean: indeed, testing point 2111 is more than 2 standard deviations above the mean. Receiving several additional testing points slightly raises the mean, but testing point 2111 is still almost 2 standard deviations above the (now slightly higher) mean, and therefore is still considered to be an outlier because it is more than 1 standard deviation above the mean.

Figure 21C:
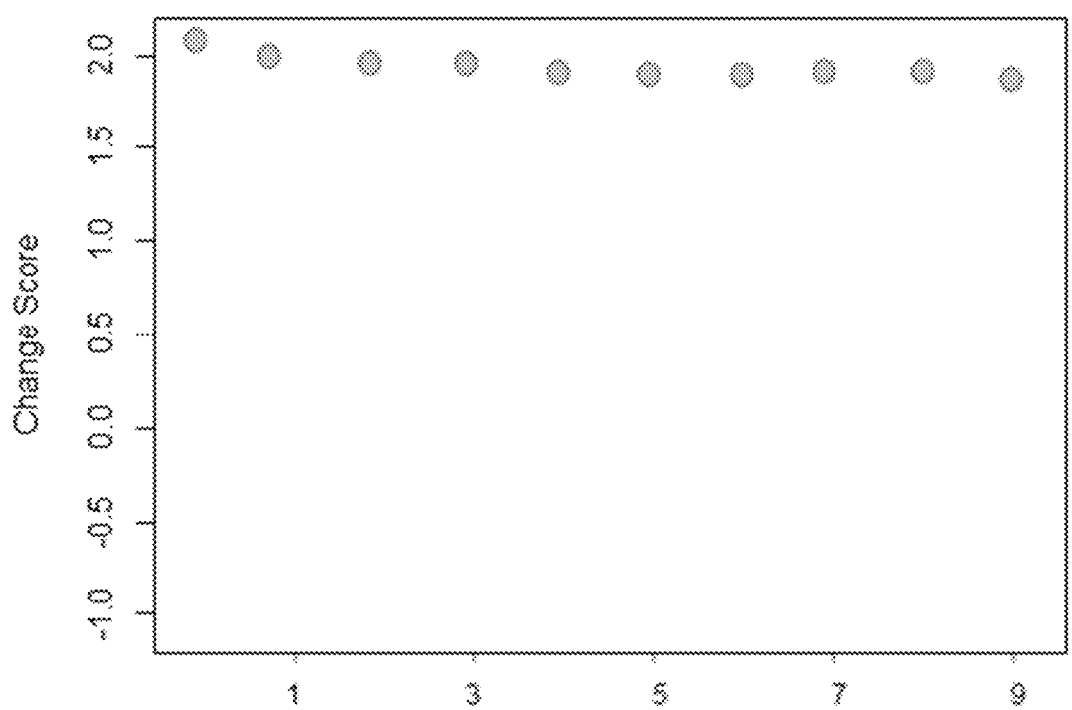
FIG. 21C shows experimental results for forward projection of univariate trace feature data with Z-score.

FIG. 21C shows experimental results for forward projection of univariate trace feature data with Z-score. Like FIG. 21B, FIG. 21C shows the manner in which the change score (shown on the y-axis) for testing point 2111 is recalculated after a number of subsequent data points (shown on the x-axis) are received. As in FIG. 21C, testing point 2111 is initially determined to be an outlier as it is significantly higher than the immediately preceding data point. However, as shown in FIG. 21C, once additional data points are received, which show a pattern more similar to FIG. 20C than FIG. 20B, testing point 2111 is no longer classified as an outlier.

Figure 22A:
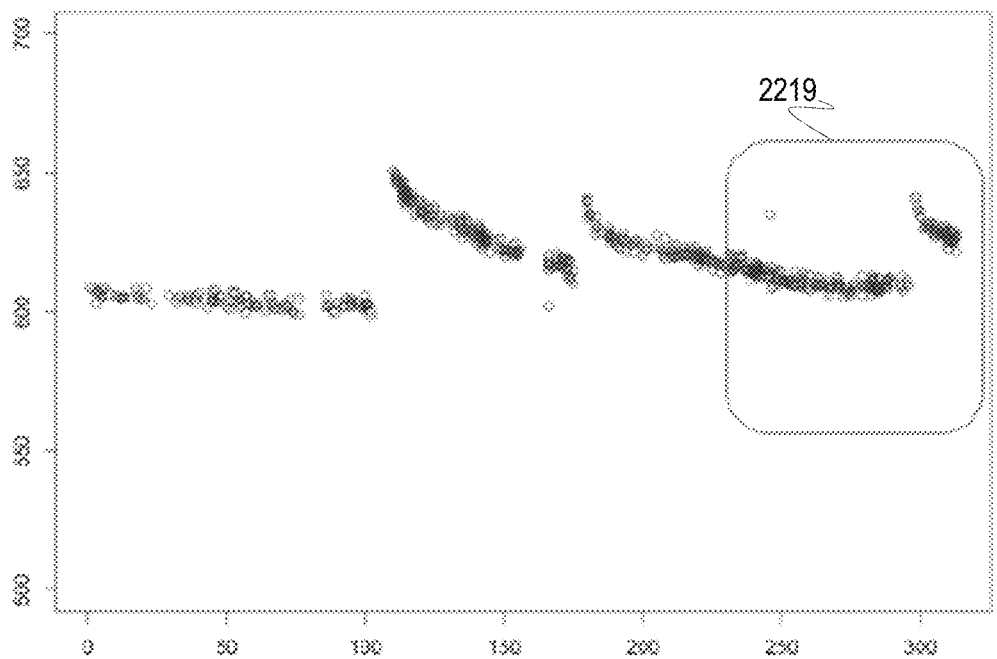
FIG. 22A shows univariate trace feature data usable with an embodiment of the present invention.

FIG. 22A shows univariate trace feature data usable with an embodiment of the present invention. The trace feature data is similar to that shown in FIGS. 15A, 20A, and 21A, and indeed testing window 2219 is similar to testing window 2119 in FIG. 21A. However, unlike FIGS. 20A and 21A, there no testing point denoted in FIG. 22A. There are 3 outliers within testing window 2219 in FIG. 22A.

Figure 22B:
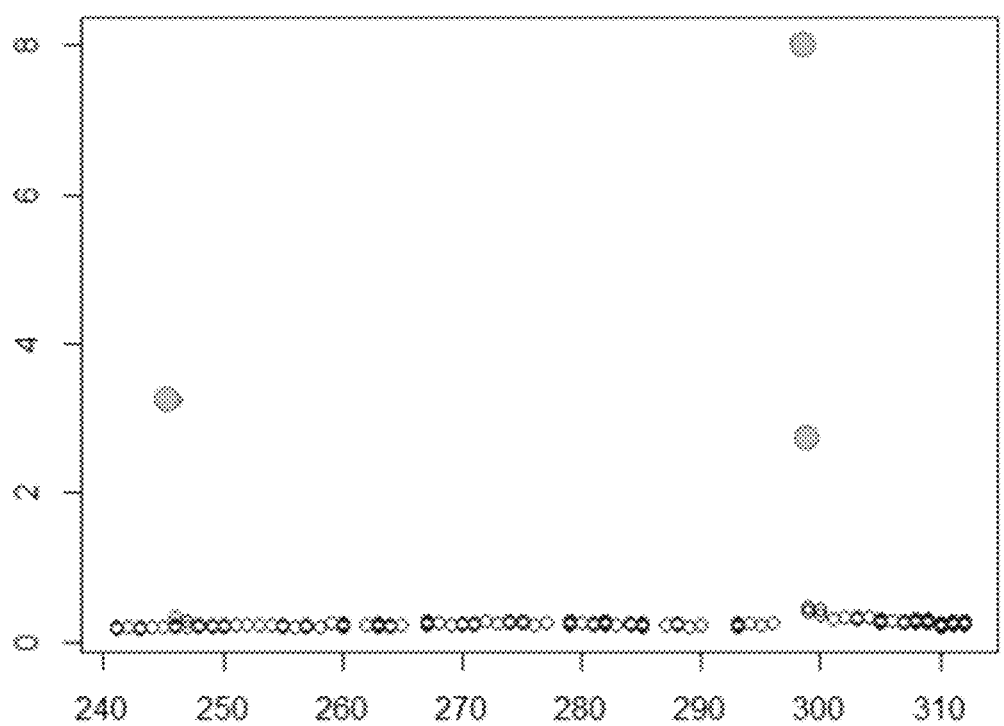
FIG. 22B shows experimental results for forward projection of univariate trace feature data with GMM in accordance with an embodiment of the present invention.

FIG. 22B shows experimental results for forward projection of univariate trace feature data with GMM in accordance with an embodiment of the present invention. Note that FIG. 22B only includes values within testing window 2219 of FIG. 22A. The illustrative embodiment of the present invention correctly identified the 3 outliers present within the testing window 2219 of the trace feature data shown in FIG. 22A.

Figure 22C:
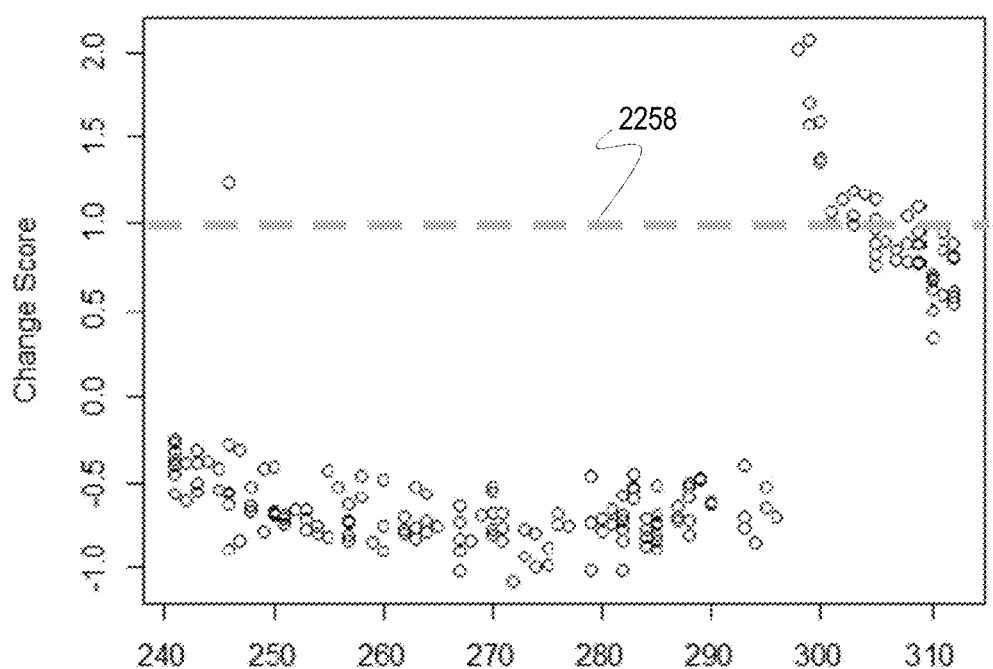
FIG. 22C shows experimental results for forward projection of univariate trace feature data with Z-score.

FIG. 22C shows experimental results for forward projection of univariate trace feature data with Z-score. Like FIG. 22B, FIG. 22C only includes values within testing window 2219 of FIG. 22A. The dashed line 2238 indicates the criterion for characterizing a value as an outlier: values above 2238 are more than 1 standard deviation above the mean, and therefore identified as outliers. Accordingly, the 17 data points in FIG. 22C are identified as outliers by this conventional methodology, rather than the 3 outliers present within the testing window 2219 of the trace feature data shown in FIG. 22A.

Figure 22D:
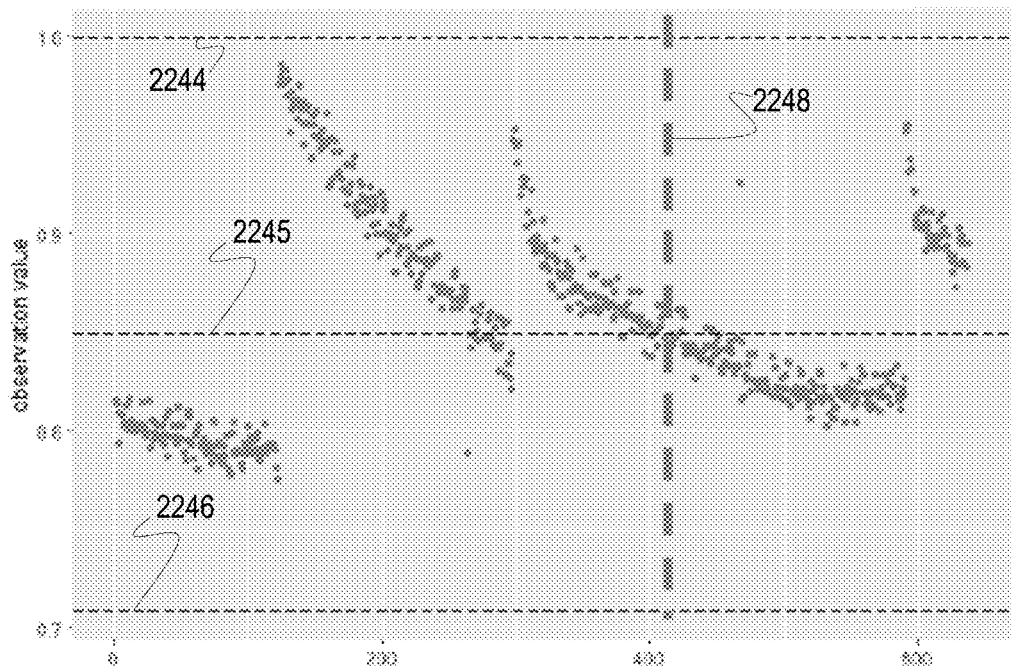
FIG. 22D shows experimental results for forward projection of univariate trace feature data in accordance with boxplot.

FIG. 22D shows experimental results for forward projection of univariate trace feature data in accordance with boxplot. Note that unlike FIGS. 22B and FIG. 22C, FIG. 22D includes all values shown in FIG. 22A, not just the values within testing window 2219. The values to the left of the vertical dashed line 2248 are training data, while values to the right of the vertical dashed line 2248 are testing data. In the boxplot shown in FIG. 22D, the horizontal dashed lines 2244, 2245, and 2246 respectively represent the first quartile (25th percentile), second quartile (50th percentile or mean), and third quartile (75th percentile) values within the data set. These horizontal dashed lines indicate the criteria for characterizing a value as an outlier: values which are not between the 25th and 75th percentile (e.g., not between dashed lines 2244 and 2246) are identified as outliers. Because none of data points shown in FIG. 22D meet these criteria, none of the 3 outliers present within the testing window 2219 of the trace feature data shown in FIG. 22A are identified as outliers by this conventional methodology.

One or more embodiments of the invention, or elements thereof, can be implemented, at least in part, in the form of an apparatus including a memory and at least one processor that is coupled to the memory and operative to perform exemplary method steps.

Figure 23:
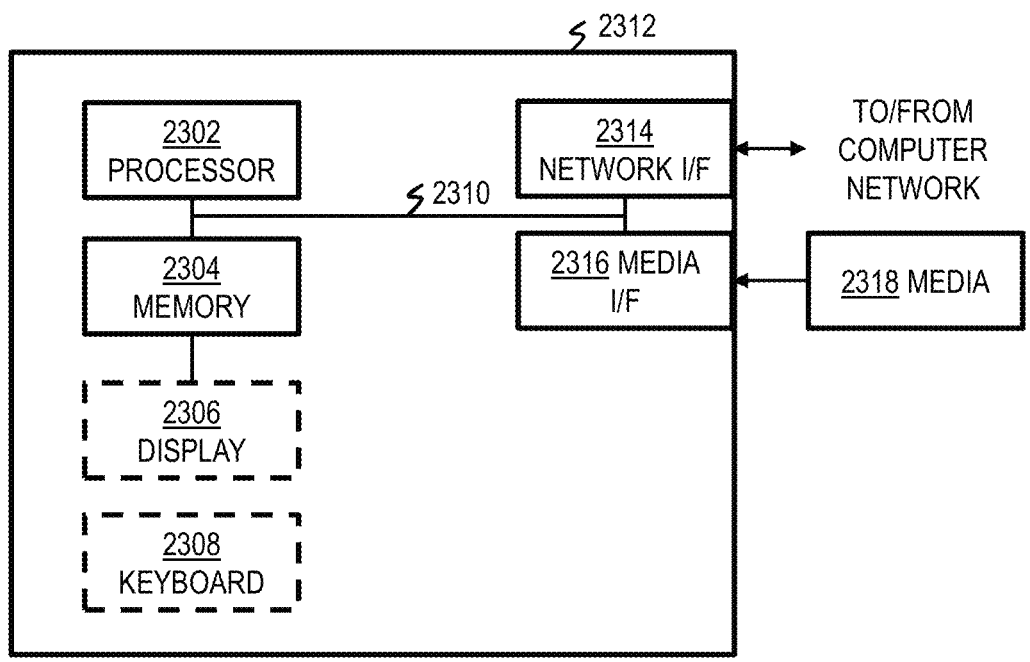
FIG. 23 depicts a computer system that may be useful in implementing one or more aspects and/or elements of the invention.

One or more embodiments can make use of software running on a general purpose computer or workstation. With reference to FIG. 23, such an implementation might employ, for example, a processor 2302, a memory 2304, and an input/output interface formed, for example, by a display 2306 and a keyboard 2308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 2302, memory 2304, and input/output interface such as display 2306 and keyboard 2308 can be interconnected, for example, via bus 2310 as part of a data processing unit 2312. Suitable interconnections, for example via bus 2310, can also be provided to a network interface 2314, such as a network card, which can be provided to interface with a computer network, and to a media interface 2316, such as a diskette or CD-ROM drive, which can be provided to interface with media 2318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 2302 coupled directly or indirectly to memory elements 2304 through a system bus 2310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 908, displays 906, pointing devices, and the like)

can be coupled to the system either directly (such as via bus 910) or through intervening I/O controllers (omitted for clarity).

Network adapters such as network interface 2314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 2312 as shown in FIG. 23) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the elements depicted in the block diagrams or other figures and/or described herein. The method steps can then be carried out using the distinct software modules and/or sub-modules of the system, as described above, executing on one or more hardware processors 2302. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of improving at least one of quality and yield of a physical process, comprising:
    obtaining values, from respective performances of the physical process, for a plurality of variables associated with the physical process;
    determining at least one Gaussian mixture model (GMM) representing the values for the plurality of variables for the performances of the physical process;
    based at least in part on the at least one Gaussian mixture model, computing at least one anomaly score for at least one of the variables for at least one of the performances of the physical process;
    based on the at least one anomaly score for the at least one of the variables exceeding a given threshold, identifying the at least one of the performances of the physical process as an outlier;
    triggering, in response to the at least one anomaly score for the at least one of the variables exceeding the given threshold, a modification of the at least one of the variables for one or more subsequent performances of the physical process so as to improve the at least one of quality and yield of the physical process, wherein the physical process comprises at least a portion of a semiconductor manufacturing process; and
    fabricating at least one semiconductor device using the semiconductor manufacturing process in accordance with the modified at least one of the variables.

2. The method of claim 1, wherein the plurality of variables associated with the physical process comprise at least one of voltage, current, power, and pressure.

3. The method of claim 1, wherein the at least one GMM comprises at least one temporally-coupled multimodal model (TMM).

4. The method of claim 3, wherein determining the at least one TMM comprises:
    determining a plurality of Gaussian graphical models (GGMs) each representing values for the plurality of variables during a respective subset of the performances of the physical process, such that each respective subset of the performances of the physical process comprises the performances of the physical process within a corresponding time period;
    determining respective mixture weights for the GGMs; and
    determining a weighted sum of the GGMs in accordance with the mixture weights.

5. The method of claim 4, wherein at least a portion of a first time period corresponding with a first one of the plurality of GGMs overlaps with at least a portion of a second time period corresponding with a second one of the plurality of GGMs.

6. The method of claim 3, wherein determining the at least one TMM comprises maximizing a constrained regularized log-likelihood.

7. The method of claim 3, wherein determining the at least one TMM comprises using an exact convex to norm.

8. The method of claim 1, wherein obtaining the values comprises converting univariate data into multivariate data based at least in part on temporal data associated with the univariate data.

9. The method of claim 8, wherein the temporal data comprises respective timestamps for values within the univariate data.

10. The method of claim 8, wherein the temporal data comprises at least one difference between immediately temporally adjacent neighboring values within the univariate data.

11. The method of claim 1, wherein a given one of the performances of the physical process is identified as an outlier when an anomaly score for any one of the variables exceeds a specified threshold for the given one of the performances.

12. The method of claim 1, further comprising recomputing the at least one anomaly score for at least one of the variables for at least one of the performances of the physical process based at least in part on values for at least one of the one or more subsequent performances of the physical process.

13. The method of claim 1, further comprising:
training the model with values from one or more past performances of the physical process; and
testing the model with values from the one or more subsequent performances of the physical process.

14. The method of claim 1, wherein identifying the outlier comprises at least one of a backward analysis of past performances and a forward projection of the one or more subsequent performances.

15. The method of claim 1, wherein computing an anomaly score for a given variable for a given performance of the physical process comprises calculating a minimum of absolute values of:
a difference between a value of the given variable for the given performance of the physical process and a value of the given variable for the given variable for a performance of the physical process directly preceding the given performance; and
a difference between the value of the given variable for the given performance and a value of the given variable for the given variable for a performance of the physical process directly following the given performance.

16. The method of claim 1, wherein computing an anomaly score for a given variable for a given performance of the given variable for a given performance of the physical process comprises calculating a difference between a value of the given variable for the given performance and an average value of the given variable for the one or more subsequent performances of the physical process.

17. The method of claim 1, wherein determining the at least one GMM comprises determining a multi-model graphical model (MGM) at least by part by performing an inverse covariance update (ICU), a temporal ordering clustering (TOC), and a sparse weight selection algorithm (SWSA).

18. An apparatus for improving at least one of quality and yield of a physical process, the apparatus comprising:
a memory; and
at least one processor coupled to the memory, the processor being operative:
to obtain values, from respective performances of the physical process, for a plurality of variables associated with the physical process;
to determine at least one Gaussian mixture model (GMM) representing the values for the plurality of variables for the performances of the physical process;
based at least in part on the at least one Gaussian mixture model, to compute at least one anomaly score for at least one of the variables for at least one of the performances of the physical process;
based on the at least one anomaly score for the at least one of the variables exceeding a given threshold, to identify the at least one of the performances of the physical process as an outlier;
to trigger, in response to the at least one anomaly score for the at least one of the variables exceeding the given threshold, a modification of the at least one of the variables for one or more subsequent performances of the physical process so as to improve the at least one of quality and yield of the physical process, wherein the physical process comprises at least a portion of a semiconductor manufacturing process; and
to control a fabrication of facilitate at least one semiconductor device using the semiconductor manufacturing process in accordance with the modified at least one of the variables.

19. A computer program product comprising a non-transitory machine readable storage medium having machine-readable program code embodied therewith for improving at least one of quality and yield of a physical process, said machine-readable program code comprising machine-readable program code configured:
to obtain values, from respective performances of the physical process, for a plurality of variables associated with the physical process;
to determine at least one Gaussian mixture model (GMM) representing the values for the plurality of variables for the performances of the physical process;
based at least in part on the at least one Gaussian mixture model, to compute at least one anomaly score for at least one of the variables for at least one of the performances of the physical process;
based on the at least one anomaly score for the at least one of the variables exceeding a given threshold, to identify the at least one of the performances of the physical process as an outlier;
to trigger, in response to the at least one anomaly score for the at least one of the variables exceeding the given threshold, a modification of the at least one of the variables for one or more subsequent performances of the physical process so as to improve the at least one of quality and yield of the physical process, wherein the physical process comprises at least a portion of a semiconductor manufacturing process; and
to control fabrication of at least one semiconductor device using the semiconductor manufacturing process in accordance with the modified at least one of the variables.

20. The method of claim 1, wherein the anomaly score is defined by $a(x)=-\ln p(x|D)$, where ln denotes a natural logarithm and $p(x|D)$ is a predictive distribution which is learned based on training data D.

* * * * *